(12) United States Patent
Chen et al.

(10) Patent No.: US 7,799,968 B2
(45) Date of Patent: Sep. 21, 2010

(54) SPONGE-LIKE PAD COMPRISING PAPER LAYERS AND METHOD OF MANUFACTURE

(75) Inventors: Fung-Jou Chen, Appleton, WI (US); Julie Bednarz, Neenah, WI (US); Jeff Lindsay, Appleton, WI (US); Dawn Houghton, Appleton, WI (US); Leslie Taneri, Appleton, WI (US); Tammy Balzar, Oshkosh, WI (US); Peiguang Zhou, Appleton, WI (US)

(73) Assignee: Kimberly-Clark Worldwide, Inc.

( * ) Notice: Subject to any disclaimer, the term of this patent is extended or adjusted under 35 U.S.C. 154(b) by 1086 days.

(21) Appl. No.: 10/036,736

(22) Filed: Dec. 21, 2001

(65) Prior Publication Data

US 2003/0135181 A1   Jul. 17, 2003

(51) Int. Cl.
*A61F 13/15* (2006.01)
*B32B 21/02* (2006.01)
*B32B 5/06* (2006.01)
*B32B 3/00* (2006.01)

(52) U.S. Cl. .................. 604/379; 604/366; 604/367; 604/375; 604/374; 604/377; 442/385; 442/389; 428/156

(58) Field of Classification Search .......... 604/366, 604/367, 375, 374, 377, 379; 442/385–389; 428/156
See application file for complete search history.

(56) References Cited

U.S. PATENT DOCUMENTS

| | | | |
|---|---|---|---|
| 1,786,513 A | 12/1930 | Zuckerman |
| 2,496,270 A | 2/1950 | Coler |
| 3,338,992 A | 8/1967 | Kinney |
| 3,341,394 A | 9/1967 | Kinney |
| 3,382,058 A | 5/1968 | Wise et al. |
| 3,418,199 A | 12/1968 | Anton et al. |
| 3,454,460 A | 7/1969 | Bosley |
| 3,502,763 A | 3/1970 | Hartmann |
| 3,542,615 A | 11/1970 | Dobo et al. |
| 3,547,763 A | 12/1970 | Hoffman, Jr. |
| 3,556,932 A | 1/1971 | Coscia et al. |
| 3,556,933 A | 1/1971 | Williams et al. |

(Continued)

FOREIGN PATENT DOCUMENTS

CA    2241820    2/1999

(Continued)

OTHER PUBLICATIONS

PCT Search Report for PCT/US03/30272, Feb. 26, 2004.

(Continued)

*Primary Examiner*—Jacqueline F. Stephens
(74) *Attorney, Agent, or Firm*—Dority & Manning, P.A.

(57) ABSTRACT

A sponge-like pad used for cleaning and other wiping and polishing applications is disclosed. The sponge-like pad is made from a plurality of textured paper webs attached together at selected locations. The paper web can be, for instance, a highly textured throughdried paper web containing high-yield fibers and a wet strength agent. In one embodiment, the stacked plies can be contained within a cover material that is liquid pervious. The sponge-like product of the present invention can be used alone or it can be incorporated into a cleaning tool, such as a mop.

64 Claims, 6 Drawing Sheets

U.S. PATENT DOCUMENTS

| | | |
|---|---|---|
| 3,585,104 A | 6/1971 | Kleinert |
| 3,692,618 A | 9/1972 | Dorschner et al. |
| 3,700,623 A | 10/1972 | Keim |
| 3,703,739 A | 11/1972 | Young et al. |
| 3,772,076 A | 11/1973 | Keim |
| 3,802,817 A | 4/1974 | Matsuki et al. |
| 3,844,880 A | 10/1974 | Meisel, Jr. et al. |
| 3,855,158 A | 12/1974 | Petrovich et al. |
| 3,872,536 A | 3/1975 | Siemund |
| 3,885,158 A | 5/1975 | Flutie et al. |
| 3,899,388 A | 8/1975 | Petrovich et al. |
| 4,129,528 A | 12/1978 | Petrovich et al. |
| 4,147,586 A | 4/1979 | Petrovich et al. |
| 4,152,807 A | 5/1979 | Smahlik |
| 4,222,921 A | 9/1980 | Van Eenam |
| 4,234,775 A | 11/1980 | Wolfberg et al. |
| 4,239,720 A | 12/1980 | Gerlach et al. |
| 4,278,634 A | 7/1981 | Zwick et al. |
| 4,297,860 A | 11/1981 | Pacifici et al. |
| 4,340,563 A | 7/1982 | Appel et al. |
| 4,381,575 A | 5/1983 | Wendt |
| 4,436,780 A | 3/1984 | Hotchkiss et al. |
| 4,437,271 A | 3/1984 | McAvoy |
| 4,440,597 A | 4/1984 | Wells et al. |
| 4,514,345 A | 4/1985 | Johnson et al. |
| 4,528,239 A | 7/1985 | Trokhan |
| 4,529,480 A | 7/1985 | Trokhan |
| 4,552,603 A | 11/1985 | Harris, Jr. et al. |
| 4,556,450 A | 12/1985 | Chuang et al. |
| 4,594,130 A | 6/1986 | Chang et al. |
| 4,606,782 A | 8/1986 | Demetriades |
| 4,659,609 A | 4/1987 | Lamers et al. |
| 4,675,226 A | 6/1987 | Ott |
| 4,675,394 A | 6/1987 | Solarek et al. |
| 4,758,297 A | 7/1988 | Calligarich |
| 4,773,110 A | 9/1988 | Hopkins |
| 4,780,361 A | 10/1988 | Schlein |
| 4,793,898 A | 12/1988 | Laamanen et al. |
| 4,820,307 A | 4/1989 | Welch et al. |
| 4,833,003 A | 5/1989 | Win et al. |
| 4,886,632 A | 12/1989 | Van Iten et al. |
| 4,971,471 A | 11/1990 | Sloan |
| 4,981,557 A | 1/1991 | Bjorkquist |
| 5,008,344 A | 4/1991 | Bjorkquist |
| 5,019,211 A | 5/1991 | Sauer |
| 5,042,986 A | 8/1991 | Kitchens et al. |
| 5,054,945 A | 10/1991 | Iggulden et al. |
| 5,057,368 A | 10/1991 | Largman et al. |
| 5,064,635 A | 11/1991 | Casey |
| 5,069,548 A | 12/1991 | Boehnlein |
| 5,069,970 A | 12/1991 | Largman et al. |
| 5,085,736 A | 2/1992 | Bjorkquist |
| 5,098,522 A | 3/1992 | Smurkoski et al. |
| 5,108,820 A | 4/1992 | Kaneko et al. |
| 5,141,803 A | 8/1992 | Pregozen |
| 5,169,571 A | 12/1992 | Buckley |
| 5,178,729 A | 1/1993 | Janda |
| 5,227,242 A | 7/1993 | Walter et al. |
| 5,228,947 A | 7/1993 | Churchland |
| 5,230,776 A | 7/1993 | Andersson et al. |
| 5,260,171 A | 11/1993 | Smurkoski et al. |
| 5,275,700 A | 1/1994 | Trokhan |
| 5,277,976 A | 1/1994 | Hogle et al. |
| 5,284,704 A | 2/1994 | Kochesky et al. |
| 5,328,565 A | 7/1994 | Rasch et al. |
| 5,334,289 A | 8/1994 | Trokhan et al. |
| 5,336,552 A | 8/1994 | Strack et al. |
| 5,338,169 A | 8/1994 | Buckley |
| 5,343,586 A | 9/1994 | Vosbikian |
| 5,353,521 A | 10/1994 | Orloff |
| 5,382,400 A | 1/1995 | Pike et al. |
| 5,429,686 A | 7/1995 | Chiu et al. |
| 5,431,786 A | 7/1995 | Rasch et al. |
| 5,443,691 A | 8/1995 | Phan et al. |
| 5,494,554 A | 2/1996 | Edwards et al. |
| 5,496,624 A | 3/1996 | Stelljes, Jr. et al. |
| 5,500,277 A | 3/1996 | Trakhan et al. |
| 5,514,523 A | 5/1996 | Trokhan et al. |
| 5,536,921 A | 7/1996 | Hedrick et al. |
| 5,548,862 A | 8/1996 | Curtis |
| 5,554,467 A | 9/1996 | Trokhan et al. |
| 5,566,724 A | 10/1996 | Trokhan et al. |
| 5,573,637 A | 11/1996 | Ampulski et al. |
| 5,582,907 A | 12/1996 | Pall |
| 5,595,628 A | 1/1997 | Gordon et al. |
| 5,598,642 A | 2/1997 | Orloff et al. |
| 5,607,980 A | 3/1997 | McAtee et al. |
| 5,609,727 A | 3/1997 | Hansen et al. |
| 5,614,293 A | 3/1997 | Krzysik et al. |
| 5,620,694 A | 4/1997 | Girardot |
| 5,624,790 A | 4/1997 | Trokhan et al. |
| 5,628,876 A | 5/1997 | Ayers et al. |
| 5,637,194 A | 6/1997 | Ampulski et al. |
| 5,643,588 A | 7/1997 | Roe et al. |
| 5,650,218 A | 7/1997 | Krzysik et al. |
| 5,656,132 A | 8/1997 | Farrington, Jr. et al. |
| 5,663,213 A | 9/1997 | Jones et al. |
| 5,672,248 A | 9/1997 | Wendt et al. |
| 5,683,794 A | 11/1997 | Wadsworth et al. |
| 5,716,692 A | 2/1998 | Warner et al. |
| 5,759,926 A | 6/1998 | Pike et al. |
| 5,772,845 A | 6/1998 | Farrington, Jr. et al. |
| 5,798,078 A | 8/1998 | Myers |
| 5,804,279 A | 9/1998 | Pluth |
| 5,830,317 A | 11/1998 | Vinson et al. |
| 5,849,000 A | 12/1998 | Anjur et al. |
| 5,855,739 A | 1/1999 | Ampulski et al. |
| 5,864,913 A | 2/1999 | Robertson et al. |
| 5,868,933 A | 2/1999 | Patrick et al. |
| 5,871,763 A | 2/1999 | Luu et al. |
| 5,897,745 A | 4/1999 | Ampulski et al. |
| 5,916,203 A | 6/1999 | Brandon et al. |
| 5,916,678 A | 6/1999 | Jackson et al. |
| 5,920,942 A | 7/1999 | Footer |
| 5,925,026 A | 7/1999 | Arteman et al. |
| 5,948,528 A | 9/1999 | Helms, Jr. et al. |
| 5,948,710 A | 9/1999 | Pomplun et al. |
| 5,951,535 A | 9/1999 | Fujiwara et al. |
| 5,958,178 A | 9/1999 | Bartsch et al. |
| 5,958,275 A | 9/1999 | Joines et al. |
| 5,958,558 A | 9/1999 | Giesfeldt et al. |
| 5,962,112 A | 10/1999 | Haynes et al. |
| 5,987,685 A | 11/1999 | Lambert |
| 5,989,478 A | 11/1999 | Oullette et al. |
| 5,990,377 A * | 11/1999 | Chen et al. .................. 604/381 |
| 6,000,089 A | 12/1999 | Renken |
| 6,001,300 A | 12/1999 | Buckley |
| 6,010,598 A | 1/2000 | Boutilier et al. |
| 6,020,580 A | 2/2000 | Lewis et al. |
| 6,044,513 A | 4/2000 | Penn |
| 6,082,915 A | 7/2000 | Kimmel |
| 6,096,169 A | 8/2000 | Hermans et al. |
| 6,103,060 A | 8/2000 | Munerelle et al. |
| 6,103,063 A | 8/2000 | Oriaran et al. |
| 6,120,642 A | 9/2000 | Lindsay et al. |
| 6,143,135 A | 11/2000 | Hada et al. |
| 6,197,154 B1 | 3/2001 | Chen et al. |
| 6,200,669 B1 | 3/2001 | Marmon et al. |
| 6,207,246 B1 | 3/2001 | Moren et al. |
| 6,207,600 B1 | 3/2001 | Nakajima et al. |
| 6,241,850 B1 | 6/2001 | Kelly |
| 6,264,791 B1 | 7/2001 | Sun et al. |
| 6,322,665 B1 | 11/2001 | Sun et al. |
| 6,328,850 B1 | 12/2001 | Phan et al. |

| | | |
|---|---|---|
| 6,342,283 B1 | 1/2002 | Mozelack et al. |
| 6,395,957 B1 | 5/2002 | Chen et al. |
| 6,399,295 B1 | 6/2002 | Kaylor et al. |
| 6,433,244 B1 | 8/2002 | Roe et al. |
| 6,436,234 B1 | 8/2002 | Chen et al. |
| 6,501,002 B1 | 12/2002 | Roe et al. |
| 6,506,803 B1 | 1/2003 | Baker, Jr. et al. |
| 6,534,174 B1 | 3/2003 | Ouellette et al. |
| 6,561,354 B1 | 5/2003 | Fereshtehkhou et al. |
| 6,565,749 B1 | 5/2003 | Hou et al. |
| 6,570,053 B2 | 5/2003 | Roe et al. |
| 6,635,676 B2 | 10/2003 | Baker, Jr. et al. |
| 6,673,982 B1 | 1/2004 | Chen et al. |
| 6,700,034 B1 | 3/2004 | Lindsay et al. |
| 6,993,805 B2 * | 2/2006 | Prodoehl et al. ............... 15/118 |
| 2003/0028985 A1 | 2/2003 | Prodoehl et al. |
| 2003/0118816 A1 | 6/2003 | Polanco et al. |
| 2003/0121380 A1 | 7/2003 | Cowell et al. |
| 2003/0121530 A1 | 7/2003 | Borgonjon et al. |
| 2003/0129908 A1 | 7/2003 | Wadsworth et al. |
| 2003/0162684 A1 | 8/2003 | Huyhn et al. |
| 2003/0164175 A1 | 9/2003 | Linzell |
| 2003/0217516 A1 | 11/2003 | Smith |
| 2004/0023014 A1 | 2/2004 | Williamson et al. |
| 2004/0077247 A1 | 4/2004 | Schmidt et al. |
| 2005/0026527 A1 | 2/2005 | Schmidt et al. |

FOREIGN PATENT DOCUMENTS

| | | |
|---|---|---|
| DE | 3546101 A1 | 6/1987 |
| EP | 0205242 A2 | 12/1986 |
| EP | 0264676 A1 | 4/1988 |
| EP | 0301962 B1 | 2/1989 |
| EP | 0597224 A2 | 5/1994 |
| EP | 0716903 A1 | 6/1996 |
| EP | 0945251 A1 | 9/1999 |
| EP | 0983014 B1 | 3/2000 |
| EP | 0986322 B1 | 3/2000 |
| EP | 1076121 A1 | 2/2001 |
| EP | 1147734 B1 | 10/2001 |
| EP | 1212974 A1 | 6/2002 |
| EP | 1314390 B1 | 5/2003 |
| FR | 2070822 | 9/1971 |
| GB | 2293611 A | 4/1996 |
| WO | WO 9302610 | 2/1993 |
| WO | WO 9523539 A1 | 9/1995 |
| WO | WO 9721865 A1 | 6/1997 |
| WO | WO 9829590 | 7/1998 |
| WO | 9842246 A1 | 10/1998 |
| WO | WO 9922686 | 5/1999 |
| WO | WO 0000148 A1 | 1/2000 |
| WO | WO 0027271 A2 | 5/2000 |
| WO | WO 0027271 A3 | 5/2000 |
| WO | WO 0065083 | 11/2000 |
| WO | WO 0065084 | 11/2000 |
| WO | WO 0065096 | 11/2000 |
| WO | WO 0065347 | 11/2000 |
| WO | WO 0065348 | 11/2000 |
| WO | WO 0111004 A1 | 2/2001 |
| WO | WO 0112414 A1 | 2/2001 |
| WO | WO 0112526 A1 | 2/2001 |
| WO | WO 0149937 A1 | 7/2001 |
| WO | WO 0154552 A1 | 8/2001 |
| WO | WO 0155552 A1 | 8/2001 |
| WO | WO 0162132 A2 | 8/2001 |
| WO | WO 0162132 A3 | 8/2001 |
| WO | WO 0200151 A2 | 1/2002 |
| WO | WO 0209491 A2 | 2/2002 |
| WO | WO 0241747 A1 | 5/2002 |
| WO | WO 0241815 A2 | 5/2002 |
| WO | WO 02083834 A1 | 10/2002 |
| WO | WO 03000104 A1 | 1/2003 |
| WO | WO 03000105 A1 | 1/2003 |
| WO | WO 03004748 A1 | 1/2003 |
| WO | WO 03011102 A1 | 2/2003 |
| WO | WO 03024295 A1 | 3/2003 |
| WO | WO 03043480 A1 | 5/2003 |

OTHER PUBLICATIONS

PCT Search Report for PCT/US03/28240, Apr. 6, 2004.
PCT Search Report and Written Opinion for PCT/US2004/017637, Oct. 6, 2004.
PCT Search Report and Written Opinion for PCT/US2004/018877, Oct. 6, 2004.
JP 8134763—Japanese Patent Abstract, May 1996, abstract only.
Int'l Search Report and Written Opinion for PCT/US2004/022440, Dec. 21, 2004.
U.S. Appl. No. 10/744,238, filed Dec. 22, 2003, Lindsay et al., Multi Purpose Cleaning Product Including a Foam and a Web.
U.S. Appl. No. 11/022,323, filed Dec. 22, 2004, Arendt et al., Composite Cleaning Products Having Shape Resilient Layer.
U.S. Appl. No. 10/479,805, filed Dec. 31, 2003, Polanco et al., High Loft Low Density Nonwoven Webs of Crimped Filament Filaments and Methods of Making Same.
U.S. Appl. No. 10/938,294, filed Sep. 10, 2004, Polanco, et al., High Loft Low Density Nonwoven Webs of Crimped Filaments and Methods of Making Same.
Article—*What's New in Highloft Production?*, Radko Krema, Oldrich Jirsak, Jaroslav Hanus, and Terry Saunders, Nonwovens Industry, Oct. 1997, pp. 74-78.
Article—*Stretching the Value of Meltblown with Cellulose Microfibers and Elastic Resins.* Ron Zhao, Biax Fiberfilm Corp., Oct. 10-14, 2004, p. 12.
Edward V. Bowden, "Non-contact drying and turning—the 'On machine' technology of the nineties", Appita J., 44(1): 41(1991).
Optics, Illumination and Image Sensing for Machine Vision VI—Publication in the International Society for Optical Engineering—vol. 1614—by Donald J. Svetkoff—Chair/Editor—Nov. 14-15, 1991 Boston, Mass.
C. W. Aurich, "Uniqueness in Foam Application," *Proc. 1992 Tappi Nonwovens Conference*, Tappi Press, Atlanta, Georgia, 1992, pp. 15-19.
F. Clifford, "Foam Finishing Technology: The Controlled Application of Chemicals to a Moving Substrate," *Textile Chemist and Colorist*, Vo. 10, No. 12, 1978, pp. 37-40.
J. D. Linsday, "Displacement Dewatering to Maintain Bulk," *Paperi Ja Puu*, vol. 74, No. 3, 1992, pp. 232-242.
M. Foulger and J. Parisian in "New Developments in Hot Pressing," *Pulp and Paper Canada*, vol. 101, No. 2, Feb. 2000, pp. 47-49.
R. James in "Squeezing More Out of Pressing and Drying," *Pulp and Paper International*, vol. 41, No. 12, Dec. 1999, pp. 13-17.
R. C. Mextaxas and R. J. Meredith in *Industrial Microwave Heating*, Peter Peregrinus, Ltd, London, 1983, pp. 183-195.
Technical Manual of the American Association of Textile Chemists and Colorists (1992), p. 99.
W. Haile, et al. In "Copolyester Polymer for Binder Fibers," *Nonwovens World*, Apr.-May 1999, pp. 120-124.
W. Hartmann in "Application Techniques for Foam Dyeing & Finishing," *Canadian Textile Journal*, Apr. 1980, pp. 55-58.
International Search Report, May 15, 2003.

* cited by examiner

SPONGE-LIKE PAD COMPRISING PAPER LAYERS AND METHOD OF MANUFACTURE

BACKGROUND OF THE INVENTION

Sponge pads are commonly used for cleaning and many other uses. Commercial sponges can be made natural sponge, which is extremely expensive, or of regenerated cellulose. Regenerated cellulose is made by dissolving relatively pure natural cellulose in a chemical solvent, followed by precipitation of the cellulose in the presence of solid particles which can be later dissolved to provide void space. Though less expensive than natural sponge, regenerated cellulose is still much more costly than cellulose materials from which it is derived, making them unsuitable for some applications where a disposable or single-use product may be desired. Further, the physical properties of a regenerated cellulose sponge are limited by the regeneration process, which imposes many restraints on what can be achieved in terms of pore structure and other physical attributes. What is needed is a way to produce a sponge-like material without the need to regenerate cellulose.

SUMMARY OF THE INVENTION

In general, the present invention is directed to an absorbent sponge-like product. The sponge-like product includes a multi-layer compressible substrate made from a plurality of stacked plies. The stacked plies are made from a textured paper web. For instance, the paper web can have an Overall Surface Depth of greater than about 0.2 mm, and particularly greater than about 0.4 mm. The paper web contains pulp fibers, such as a mixture of high-yield fibers and other paper making fibers, such as hardwood fibers and/or softwood fibers. The paper web can have a basis weight of at least about 15 gsm, such as from about 15 gsm to about 80 gsm.

In one embodiment, the compressible substrate is made from multiple plies of a throughdried paper web. The throughdried paper web can have a molded textured surface created during throughdrying. In addition to high-yield fibers, the paper web can also contain a wet strength agent. By containing high-yield fibers in combination with a wet strength agent, the paper web is found to have improved wet resiliency properties.

The multi-layer compressible substrate can be made from at least 3 plies, particularly at least 5 plies, and more particularly at least 10 plies. The plies can be attached together at selected locations for forming an integral compressible material. Once attached together, the compressible substrate can have a void volume of at least 50%, can have a Wet Springback of at least 0.6, can have a Loading Energy Ratio of at least 0.6, and can have a Wet Compressed Bulk of at least 6 cubic centimeters per gram.

The stacked plies can be attached together in any suitable manner. In one embodiment, for instance, binder fibers, such as bicomponent fibers, can be positioned in between the layers and heated causing the fibers to melt and attach the layers together. In this embodiment, the binder fibers can be applied to each ply in an amount that can be, for example, from about 1% to about 20% by weight of the ply.

In one embodiment, the multi-layer compressible substrate can be contained within an outer cover. The outer cover can be made from any suitable wet resilient material that allows liquids to pass therethrough. For example, the outer cover can be made from a meltblown web, a spunbond web, a paper towel, a bonded carded web, a scrim material, a mesh material, a net, an apertured material, and mixtures thereof.

In one embodiment, the outer cover can be made by attaching together two different materials. The outer cover can include a first primary surface and a secondary surface. The first primary surface can be made from a meltspun nonwoven web having an abrasive surface. For example, the nonwoven web can be a meltblown web having shot present on the surface of the web. Alternatively, other abrasive materials can be attached to the surface of the web. In one embodiment, a nonwoven web such as a meltblown is formed directly on the surface of one or both of the outermost tissue plies.

If desired, an additive can be incorporated into the absorbent sponge-like product. The additive can be, for instance, a soap, a detergent, a buffering agent, an antimicrobial agent, a skin wellness agent, a lotion, or mixtures thereof. The sponge-like product can also comprise an agent that changes color or provides other cues in the present of an analyte. Suitable agents for the detection various analytes are disclosed in WO 00/65347, published Nov. 2, 2000 by Hammons et al.; WO 00/65348, published Nov. 2, 2000 by Roe et al.; WO 00/65083, WO 00/65084; and WO 00/65096, each published Nov. 2, 2000 by Capri et al., the US equivalents of which are U.S. patent application Ser. Nos. 09/299,399; 09/317,441; and 09/317,481; each of which is herein incorporated by reference to the extent it is not contradictory herewith.

Further, the absorbent sponge-like product of the present invention can be incorporated into various cleaning tools. For instance, the sponge-like product can be attached to a handle and used to clean various surfaces. For example, in one embodiment, the sponge-like product can be incorporated into a mop.

Other features and aspect of the present invention are discussed in greater detail below.

DEFINITIONS AND TEST METHODS

As used herein, a material is said to be "absorbent" if it can retain an amount of water equal to at least 100% of its dry weight as measured by the test for Hang Drip Absorbent Capacity given below (i.e., the material has an Hang Drip Absorbent Capacity of at about 1 or greater). For example, the absorbent materials used in the absorbent members of the present invention can have an Hang Drip Absorbent Capacity of about 2 or greater, more specifically about 4 or greater, more specifically still about 7 or greater, and more specifically still about 10 or greater, with exemplary ranges of from about 3 to about 30 or from about 4 to about 25 or from about 12 to about 30.

As used herein, "Absorption Capacity" is a measure of the mass of water that a pad can hold after it has been immersed and withdrawn from a pool of water. Absorption Capacity is measured by first weighing a dry, clean pad cut to dimensions of 3-inches square, then immersing the pad in deionized water at 25° C. for 60 seconds, holding the pad in a flat, horizontal position with the primary working surface of the pad down, such that the highest portion of the pad is 1 inch below the surface of the water. The pad is then slowly raised from the water over a period of about 2 second using a wire basket that was previously resting in the bottom of the container holding the water. The wire basket had a coarse 4 by 4 mesh such that it does not impede the dripping of water from the pad when the pad is removed from the water. The wire basket is used to hold the pad in a horizontal orientation as water drips from the pad (i.e., when the webs are aligned in a plane, that plane should be horizontal for this test). Dripping is allowed to occur for 30 seconds, after which the wet pad is weighed. The gain in mass relative to the mass of the dry pad before immersion, divided by the mass of the dry pad, is the Absorption Capacity. The pad can have a water Absorption Capacity of at least any of the following: 4, 6, 8, 9, 10, 12, and 18 with exemplary ranges of from about 5 to about 40, or from about 6 to about 24.

"Absorbency at 0.075 psi" is a measure of absorbent capacity of the tissue layers used to construct a pad of the present invention, with the test being conducted under a load of 0.075 psi. The test requires two metal plates cut to a length of 6 inches and a width of 4 inches. A lower plate is 0.125-inches thick and the upper plate is ¾-inch thick aluminum having a mass of 813 g, which imparts a load of 0.075 psi when placed flat on a tissue sample. The center of the upper plate has a cylindrical hole 0.25-inches in diameter. To perform the test, 4-in×6-in samples of dry tissue are cut, with the 6-in length being aligned with the machine direction. Multiple tissue plies are stacked to achieve a tissue stack weight as close to 2.8 grams as possible. The tissue stack is placed between the two horizontal plates, which lie flat in a larger tray. A titrating burette with 50 ml of deionized water is aligned directly above the hole in the upper plate. The burette is opened and water is allowed to slowly enter the hole in the upper plate such that the hole is filled with a column of water that is maintained as high as possible without rising above or spilling onto the upper surface of the plate. This is done until the sample is apparently saturated. Apparent saturation is the point at which water begins to leave any edge of the sample. The mass of water that has been removed from the burette is taken as the value for "Horizontal Absorbency at 0.075 psi." At that point, the tray containing the plates is tilted at a 45° angle for 30 seconds to allow some of the liquid in the sample to drain. The mass of any liquid that drains out is subtracted from the previous "Horizontal Absorbency at 0.075 psi" value to yield "Tilted Absorbency at 0.075 psi." For the basesheet, the horizontal absorbency at 0.075 psi can be about 5 g or greater, or alternatively 7 g or greater, 9 g or greater, 11 g or greater, or from about 6 g to about 10 g. The tilted absorbency at 0.075 psi may be about 4 g or greater, about 6 g or greater, about 8 g or greater, about 10 g or greater, or from about 6 to about 10 g. The tilted absorbency of the cover may be about 5 to 40% less than that off the basesheet alone, while the horizontal absorbency may be greater or lower than that off the basesheet.

As used herein, "Hang Drip Absorbent Capacity" refers to the amount of water that a saturated sample can hold relative to the dry weight of the sample and is reported as a dimensionless number (mass divided by mass). The test is performed according to Federal Government Specification UU-T-595b, but modified to use a test sample cut to dimensions of 7.62 cm long×7.62 cm wide (3 inches square) rather than 10.16 cm long by 10.16 cm wide (4 inches square). The dry, clean sample is weighed and then saturated by soaking it in deionized water at 25° C. for three minutes. The sample is then carefully removed from the water using tweezers or forceps and hung by one corner for 30 seconds to allow excess water to be drained off. The sample is then re-weighed, and the difference between the wet and dry weights is the water pickup of the sample expressed in grams per 10.16 cm long by 10.16 cm wide sample. The Hang Drip Absorbent Capacity value is obtained by dividing the total water pick-up by the dry weight of the sample.

As used herein, "Dry Caliper" refers to the thickness of a pad or other material under a compressive load of 0.03 psi as measured with a thickness gage having a 1-inch diameter platen (measurement "foot"). Measurements reported herein were obtained using a CSI Model CS-55-170 Manual Thickness Gage (Custom Scientific Instruments, Whippany, N.J.). The 0.03 psi pressure is applied for 30 seconds before a thickness reading is taken. The thickness is reported in inches.

As used herein, "Wet Compression Recovery" is a measure of the ability of a pad to maintain its thickness after being saturated and compressed through several cycles. The test is performed on a three-inch square sample immediately after the sample has been saturated and weighed, according to the Absorption Capacity test previously described. The wet sample is first subjected to a thickness measurement using a lightly loaded platen-based thickness gauge. Specifically, a pressure of 0.03 psi is applied to the center of the pad with a 1-inch diameter platen (the measurement "foot") using a CSI Model CS-55-170 Manual Thickness Gage (Custom Scientific Instruments, Whippany, N.J.) to measure the initial thickness of the pad. With this test device, the pressure is applied using standardized weights that rest on a weight holder connected to the platen, and thickness relative to a flat surface is read from a dial gage. After taking the initial thickness reading, an additional weight is slowly added to the weight holder to increase the applied pressure to 1.125 psi. When the weight is added to or lifted off the weight holder, the rate of elevation or descent of the weight while in contact with the test device or other weights thereon is approximately 2 inches per minute to prevent sudden impulses being applied to the sample or the test device. After waiting for 30 seconds at the applied pressure of 1.125 psi, the thickness reading is taken (Compression #1). The platen is raised again and the added weight is slowly removed to return the applied pressure to 0.03 psi. After 30 seconds, the thickness reading is recorded (Recovery #1). The added weight is added again to bring the load back to 1.125 psi, and after 30 seconds the thickness is recorded (Compression #2). The added weight is removed to return to an applied load of 0.03 psi and, after 30 seconds, the thickness is again recorded (Recovery #2), which is the final recorded thickness. The ratio of the final thickness (Recovery #2) to the initial thickness is multiplied by 100 to express the Wet Compression Recovery as a percentage. Pads of the present invention, with or without a cover in place, can have a Wet Compression Recovery of 0.6 or greater, more specifically about 0.7 or greater, more specifically still about 0.8 or greater, and most specifically about 0.85 to greater, with an exemplary range of from about 0.75 to about 0.92.

As used herein, "Water Retention Value" (WRV) is a measure that can be used to characterize some fibers useful for purposes of this invention. WRV is measured by dispersing 0.5 gram of fibers in deionized water, soaking overnight, then centrifuging the fibers in a 4.83 cm (1.9 inch) diameter tube with an 0.15 mm (100 mesh) screen at the bottom at 1000 gravities for 20 minutes. The samples are weighed, then dried at 105° C. for two hours and then weighed again. WRV is (wet weight-dry weight)/dry weight. Fibers useful for purposes of this invention can have a WRV of about 0.7 or greater, more specifically from about 1 to about 2. High yield pulp fibers typically have a WRV of about 1 or greater.

As used herein, "dry bulk" is measured with a thickness gauge having a circular platen 3 inches in diameter such that a pressure of 0.05 psi is applied to the sample, which should be conditioned at 50% relative humidity and at 73° F. for 24 hours prior to measurement. The tissue web can have a dry bulk of 3 cc/g or greater, preferably 6 cc/g or greater, more preferably 9 cc/g or greater, more preferably still 11 cc/g or greater, and most preferably between 8 cc/g and 28 cc/g.

"Papermaking fibers," as used herein, include all known cellulosic fibers or fiber mixes comprising cellulosic fibers. Fibers suitable for making the webs of this invention comprise any natural or synthetic cellulosic fibers including, but not limited to nonwoody fibers, such as cotton, abaca, kenaf, sabai grass, flax, esparto grass, straw, jute hemp, bagasse, milkweed floss fibers, and pineapple leaf fibers; and woody fibers such as those obtained from deciduous and coniferous trees, including softwood fibers, such as northern and southern softwood kraft fibers; hardwood fibers, such as eucalyptus, maple, birch, and aspen. Woody fibers can be prepared in high-yield or low-yield forms and can be pulped in any known method, including kraft, sulfite, high-yield pulping methods and other known pulping methods. Fibers prepared from organosolv pulping methods can also be used, including the fibers and methods disclosed in U.S. Pat. No. 4,793,898, issued Dec. 27, 1988 to Laamanen et al.; U.S. Pat. No. 4,594, 130, issued Jun. 10, 1986 to Chang et al.; and U.S. Pat. No. 3,585,104. Useful fibers can also be produced by anthraquinone pulping, exemplified by U.S. Pat. No. 5,595, 628, issued Jan. 21, 1997 to Gordon et al. A portion of the fibers, such as up to 50% or less by dry weight, or from about 5% to about 30% by dry weight, can be synthetic fibers such as rayon, polyolefin fibers, polyester fibers, bicomponent sheath-core fibers, multicomponent binder fibers, and the like. An exemplary polyethylene fiber is Pulpex®, available from Hercules, Inc. (Wilmington, Del.). Any known bleaching method can be used. Synthetic cellulose fiber types include rayon in all its varieties and other fibers derived from viscose or chemically modified cellulose. Chemically treated natural cellulosic fibers can be used such as mercerized pulps, chemically stiffened or crosslinked fibers, or sulfonated fibers. For good mechanical properties in using papermaking fibers, it can be desirable that the fibers be relatively undamaged and largely unrefined or only lightly refined. While recycled fibers can be used, virgin fibers are generally useful for their mechanical properties and lack of contaminants. Mercerized fibers, regenerated cellulosic fibers, cellulose produced by microbes, rayon, and other cellulosic material or cellulosic derivatives can be used. Suitable papermaking fibers can also include recycled fibers, virgin fibers, or mixes thereof. In certain embodiments capable of high bulk and good compressive properties, the fibers can have a Canadian Standard Freeness of at least 200, more specifically at least 300, more specifically still at least 400, and most specifically at least 500.

As used herein, "high yield pulp fibers" are those papermaking fibers produced by pulping processes providing a yield of about 65 percent or greater, more specifically about 75 percent or greater, and still more specifically from about 75 to about 95 percent. Yield is the resulting amount of processed fiber expressed as a percentage of the initial wood mass. Such pulping processes include bleached chemithermomechanical pulp (BCTMP), chemithermomechanical pulp (CTMP) pressure/pressure thermomechanical pulp (PTMP), thermomechanical pulp (TMP), thermomechanical chemical pulp (TMCP), high yield sulfite pulps, and high yield kraft pulps, all of which leave the resulting fibers with high levels of lignin. High yield fibers are well known for their stiffness (in both dry and wet states) relative to typical chemically pulped fibers. The cell wall of kraft and other non-high yield fibers tends to be more flexible because lignin, the "mortar" or "glue" on and in part of the cell wall, has been largely removed. Lignin is also nonswelling in water and hydrophobic, and resists the softening effect of water on the fiber, maintaining the stiffness of the cell wall in wetted high yield fibers relative to kraft fibers. The preferred high yield pulp fibers can also be characterized by being comprised of comparatively whole, relatively undamaged fibers, high freeness (250 Canadian Standard Freeness (CSF) or greater, more specifically 350 CFS or greater, and still more specifically 400 CFS or greater), and low fines content (less than 25 percent, more specifically less than 20 percent, still more specifically less that 15 percent, and still more specifically less than 10 percent by the Britt jar test). In addition to common papermaking fibers listed above, high yield pulp fibers also include other natural fibers such as milkweed seed floss fibers, abaca, hemp, cotton and the like.

As used herein, the term "cellulosic" is meant to include any material having cellulose as a major constituent, and specifically comprising about 50 percent or more by weight of cellulose or cellulose derivatives. Thus, the term includes cotton, typical wood pulps, nonwoody cellulosic fibers, cellulose acetate, cellulose triacetate, rayon, viscose fibers, thermomechanical wood pulp, chemical wood pulp, debonded chemical wood pulp, lyocell and other fibers formed from solutions of cellulose in NMMO, milkweed, or bacterial cellulose, lyocell, and can be viscose, rayon, and the like. Fibers that have not been spun or regenerated from solution can be used exclusively, if desired, or at least about 80% of the web can be free of spun fibers or fibers generated from a cellulose solution.

"Noncompressive drying" refers to drying methods for drying cellulosic webs that do not involve compressive nips or other steps causing significant densification or compression of a portion of the web during the drying process. Such methods include through-air drying; air jet impingement drying; non-contacting drying such as air flotation drying, as taught by E. V. Bowden, E. V., Appita J., 44(1): 41 (1991); through-flow or impingement of superheated steam; microwave drying and other radiofrequency or dielectric drying methods; water extraction by supercritical fluids; water extraction by nonaqueous, low surface tension fluids; infrared drying; drying by contact with a film of molten metal; and other methods. It is believed that the three-dimensional basesheets of the present invention could be dried with any of the above mentioned noncompressive drying means without causing significant web densification or a significant loss of their three-dimensional structure and their wet resiliency properties. Standard dry creping technology is viewed as a compressive drying method since the web must be mechanically pressed onto part of the drying surface, causing significant densification of the regions pressed onto the heated Yankee cylinder.

As used herein, the term "polymeric web" refers to a porous or nonporous layer primarily composed of polymeric material, and can be a nonwoven web, a plastic film, a polymeric film, an apertured film, or a layer of foam. Polymeric webs can be used as wicking barriers, baffle layers, backsheets, and, if sufficiently liquid pervious, as topsheets of absorbent articles. A polymeric web can consist of about 50 weight percent or more polymeric material, more specifically about 80 weight percent or more polymeric material, and most specifically about 90 weight percent or more polymeric material. Exemplary materials include polyolefins, polyesters, polyvinyl compounds, and polyamides.

As used herein, "bulk" and "density," unless otherwise specified, are based on an oven-dry mass of a sample and a thickness measurement made at a load of 0.34 kPa (0.05 psi) with a 7.62-cm (three-inch) diameter circular platen. Details for thickness measurements and other forms of bulk are described hereafter.

"Overall Surface Depth". A three-dimensional basesheet or web is a sheet with significant variation in surface elevation due to the intrinsic structure of the sheet itself. As used herein, this elevation difference is expressed as the "Overall Surface Depth." The basesheets useful for this invention possess three-dimensionality and have an Overall Surface Depth of about 0.1 mm. or greater, more specifically about 0.3 mm. or greater, still more specifically about 0.4 mm. or greater, still more specifically about 0.5 mm. or greater, and still more specifically from about 0.4 to about 0.8 mm.

The three-dimensional structure of a largely planar sheet can be described in terms of its surface topography. Rather than presenting a nearly flat surface, as is typical of conventional paper, the molded sheets useful in producing the present invention have significant topographical structures that, in one embodiment, may derive in part from the use of sculptured through-drying fabrics such as those taught by Chiu et al. in U.S. Pat. No. 5,429,686, previously incorporated by reference. The resulting basesheet surface topography typically comprises a regular repeating unit cell that is typically a parallelogram with sides between 2 and 20 mm in length. For wetlaid materials, it is preferred that these three-dimensional basesheet structures be created by molding the moist sheet or be created prior to drying, rather than by creping or embossing or other operations after the sheet has been dried. In this manner, the three-dimensional basesheet structure is more likely to be well-retained upon wetting, helping to provide high wet resiliency and to promote good in-plane permeability. For air-laid basesheets, the structure may be imparted by thermal embossing of a fibrous mat with binder fibers that are activated by heat. For example, an air-laid fibrous mat containing thermoplastic or hot melt binder fibers may be heated and then embossed before the structure cools to permanently give the sheet a three-dimensional structure.

In addition to the regular geometrical structure imparted by the sculptured fabrics and other fabrics used in creating a basesheet, additional fine structure, with an in-plane length scale less than about 1 mm, can be present in the basesheet. Such a fine structure can stem from microfolds created during differential velocity transfer of the web from one fabric or wire to another prior to drying. Some of the materials of the present invention, for example, appear to have fine structure with a fine surface depth of 0.1 mm or greater, and sometimes 0.2 mm or greater, when height profiles are measured using a commercial moiré interferometer system. These fine peaks have a typical half-width less than 1 mm. The fine structure from differential velocity transfer and other treatments may be useful in providing additional softness, flexibility, and bulk. Measurement of the surface structures is described below.

An especially suitable method for measurement of Overall Surface Depth is moiré interferometry, which permits accurate measurement without deformation of the surface. For reference to the materials of the present invention, surface topography should be measured using a computer-controlled white-light field-shifted moiré interferometer with about a 38 mm field of view. The principles of a useful implementation of such a system are described in Bieman et al. (L. Bieman, K. Harding, and A. Boehnlein, "Absolute Measurement Using Field-Shifted Moiré," SPIE Optical Conference Proceedings, Vol. 1614, pp. 259-264, 1991). A suitable commercial instrument for moiré interferometry is the CADEYES® interferometer produced by Medar, Inc. (Farmington Hills, Mich.), constructed for a 38-mm field-of-view (a field of view within the range of 37 to 39.5 mm is adequate). The CADEYES® system uses white light which is projected through a grid to project fine black lines onto the sample surface. The surface is viewed through a similar grid, creating moiré fringes that are viewed by a CCD camera. Suitable lenses and a stepper motor adjust the optical configuration for field shifting (a technique described below). A video processor sends captured fringe images to a PC computer for processing, allowing details of surface height to be back-calculated from the fringe patterns viewed by the video camera.

In the CADEYES moiré interferometry system, each pixel in the CCD video image is said to belong to a moiré fringe that is associated with a particular height range. The method of field-shifting, as described by Bieman et al. (L. Bieman, K. Harding, and A. Boehnlein, "Absolute Measurement Using Field-Shifted Moiré," SPIE Optical Conference Proceedings, Vol. 1614, pp. 259-264, 1991) and as originally patented by Boehnlein (U.S. Pat. No. 5,069,548, herein incorporated by reference), is used to identify the fringe number for each point in the video image (indicating which fringe a point belongs to). The fringe number is needed to determine the absolute height at the measurement point relative to a reference plane. A field-shifting technique (sometimes termed phase-shifting in the art) is also used for sub-fringe analysis (accurate determination of the height of the measurement point within the height range occupied by its fringe). These field-shifting methods coupled with a camera-based interferometry approach allows accurate and rapid absolute height measurement, permitting measurement to be made in spite of possible height discontinuities in the surface. The technique allows absolute height of each of the roughly 250,000 discrete points (pixels) on the sample surface to be obtained, if suitable optics, video hardware, data acquisition equipment, and software are used that incorporates the principles of moiré interferometry with field-shifting. Each point measured has a resolution of approximately 1.5 microns in its height measurement.

The computerized interferometer system is used to acquire topographical data and then to generate a grayscale image of the topographical data, said image to be hereinafter called "the height map." The height map is displayed on a computer monitor, typically in 256 shades of gray and is quantitatively based on the topographical data obtained for the sample being measured. The resulting height map for the 38-mm square measurement area should contain approximately 250,000 data points corresponding to approximately 500 pixels in both the horizontal and vertical directions of the displayed height map. The pixel dimensions of the height map are based on a 512×512 CCD camera which provides images of moiré patterns on the sample which can be analyzed by computer software. Each pixel in the height map represents a height measurement at the corresponding x- and y-location on the sample. In the recommended system, each pixel has a width of approximately 70 microns, i.e. represents a region on the sample surface about 70 microns long in both orthogonal in-plane directions). This level of resolution prevents single fibers projecting above the surface from having a significant effect on the surface height measurement. The z-direction height measurement must have a nominal accuracy of less than 2 microns and a z-direction range of at least 1.5 mm. (For further background on the measurement method, see the CADEYES Product Guide, Medar, Inc., Farmington Hills, Mich., 1994, or other CADEYES manuals and publications of Medar, Inc.)

The CADEYES system can measure up to 8 moiré fringes, with each fringe being divided into 256 depth counts (sub-fringe height increments, the smallest resolvable height difference). There will be 2048 height counts over the measurement range. This determines the total z-direction range, which is approximately 3 mm in the 38-mm field-of-view instrument. If the height variation in the field of view covers more than eight fringes, a wrap-around effect occurs, in which the ninth fringe is labeled as if it were the first fringe and the tenth fringe is labeled as the second, etc. In other words, the measured height will be shifted by 2048 depth counts. Accurate measurement is limited to the main field of 8 fringes.

The moiré interferometer system, once installed and factory calibrated to provide the accuracy and z-direction range stated above, can provide accurate topographical data for materials such as paper towels. (Those skilled in the art may confirm the accuracy of factory calibration by performing measurements on surfaces with known dimensions.) Tests are performed in a room under Tappi conditions (73° F., 50% relative humidity). The sample must be placed flat on a surface lying aligned or nearly aligned with the measurement plane of the instrument and should be at such a height that both the lowest and highest regions of interest are within the measurement region of the instrument.

Once properly placed, data acquisition is initiated using Medar's PC software and a height map of 250,000 data points is acquired and displayed, typically within 30 seconds from the time data acquisition was initiated. (Using the CADEYES® system, the "contrast threshold level" for noise rejection is set to 1, providing some noise rejection without excessive rejection of data points.) Data reduction and display are achieved using CADEYES® software for PCs, which incorporates a customizable interface based on Microsoft Visual Basic Professional for Windows (version 3.0). The Visual Basic interface allows users to add custom analysis tools.

The height map of the topographical data can then be used by those skilled in the art to identify characteristic unit cell structures (in the case of structures created by fabric patterns; these are typically parallelograms arranged like tiles to cover a larger two-dimensional area) and to measure the typical peak to valley depth of such structures. A simple method of doing this is to extract two-dimensional height profiles from lines drawn on the topographical height map which pass through the highest and lowest areas of the unit cells. These height profiles can then be analyzed for the peak to valley distance, if the profiles are taken from a sheet or portion of the sheet that was lying relatively flat when measured. To eliminate the effect of occasional optical noise and possible outliers, the highest 10% and the lowest 10% of the profile should be excluded, and the height range of the remaining points is taken as the surface depth. Technically, the procedure requires calculating the variable which we term "P10," defined at the height difference between the 10% and 90% material lines, with the concept of material lines being well known in the art, as explained by L. Mummery, in *Surface Texture Analysis: The Handbook*, Hommelwerke GmbH, Mühlhausen, Germany, 1990. In this approach, the surface is viewed as a transition from air to material. For a given profile 30, taken from a flat-lying sheet, the greatest height at which the surface begins—the height of the highest peak—is the elevation of the "0% reference line" or the "0% material line," meaning that 0% of the length of the horizontal line at that height is occupied by material. Along the horizontal line passing through the lowest point of the profile, 100% of the line is occupied by material, making that line the "100% material line". In between the 0% and 100% material lines (between the maximum and minimum points of the profile), the fraction of horizontal line length occupied by material will increase monotonically as the line elevation is decreased. The material ratio curve 36 gives the relationship between material fraction along a horizontal line passing through the profile and the height of the line. The material ratio curve is also the cumulative height distribution of a profile. (A more accurate term might be "material fraction curve.")

Once the material ratio curve is established, one can use it to define a characteristic peak height of the profile. The P10 "typical peak-to-valley height" parameter is defined as the difference between the heights of the 10% material line and the 90% material line. This parameter is relatively robust in that outliers or unusual excursions from the typical profile structure have little influence on the P10 height. The units of P10 are mm. The Overall Surface Depth of a material is reported as the P10 surface depth value for profile lines encompassing the height extremes of the typical unit cell of that surface. "Fine surface depth" is the P10 value for a profile taken along a plateau region of the surface which is relatively uniform in height relative to profiles encompassing a maxima and minima of the unit cells. Measurements are reported for the most textured side of the basesheets of the present invention, which is typically the side that was in contact with the through-drying fabric when air flow is toward the through-dryer.

Overall Surface Depth is intended to examine the topography produced in the tissue web, especially those features created in the sheet prior to and during drying processes, but is intended to exclude "artificially" created large-scale topography from dry converting operations such as embossing, perforating, pleating, etc. Therefore, the profiles examined should be taken from unembossed regions if the tissue web has been embossed, or should be measured on an unembossed tissue web. Overall Surface Depth measurements should exclude large-scale structures such as pleats or folds which do not reflect the three-dimensional nature of the original basesheet itself. It is recognized that sheet topography may be reduced by calendering and other operations which affect the entire basesheet. Overall Surface Depth measurement can be appropriately performed on a calendered basesheet.

The "Wet Wrinkle Recovery Test" is a slight modification of AATCC Test Method 66-1990 taken from the Technical Manual of the American Association of Textile Chemists and Colorists (1992), page 99. The modification is to first wet the samples before carrying out the method. This is done by soaking the samples in water containing 0.01 percent TRITON X-100 wetting agent (Rohm & Haas) for five minutes before testing. Sample preparation is carried out at 73° F. and 50 percent relative humidity. The sample is gently removed from the water with a tweezers, drained by pressing between two pieces of blotter paper with 325 grams of weight, and placed in the sample holder to be tested as with the dry wrinkle recovery test method. The test measures the highest recovery angle of the sample being tested (in any direction, including the machine direction and the cross-machine direction), with 180° representing total recovery. The Wet Wrinkle Recovery, expressed as a percent recovery, is the measured recovery angle divided by 180°, multiplied by 100. Tissue webs of use in the present invention can exhibit a Wet Wrinkle Recovery of about 60 percent or greater, more specifically about 70 percent or greater, and still more specifically about 80 percent or greater.

"Wet compressive resiliency" of the tissue sheets is defined by several parameters and can be demonstrated using a materials property procedure that encompasses both wet and dry characteristics. A programmable strength measurement device is used in compression mode to impart a specified series of compression cycles to an initially dry, conditioned sample, after which the sample is carefully moistened in a specified manner and subjected to the same sequence of compression cycles. While the comparison of wet and dry properties is of general interest, the most important information from this test concerns the wet properties. The initial testing of the dry sample can be viewed as a conditioning step. The test sequence begins with compression of the dry sample to 0.025 psi to obtain an initial thickness (cycle A), then two repetitions of loading up to 2 psi followed by unloading (cycles B and C). Finally, the sample is again compressed to 0.025 psi to obtain a final thickness (cycle D). (Details of the procedure, including compression speeds, are given below). Following the treatment of the dry sample, moisture is applied uniformly to the sample using a fine mist of deionized water to bring the moisture ratio (g water/g dry fiber) to approximately 1.1. This is done by applying 95-110% added moisture, based on the conditioned sample mass. This puts typical cellulosic materials in a moisture range where physical properties are relatively insensitive to moisture content (e.g., the sensitivity is much less than it is for moisture ratios less than 70%). The moistened sample is then placed in the test device and the compression cycles are repeated.

Three measures of wet resiliency are considered which are relatively insensitive to the number of sample layers used in the stack. The first measure is the bulk of the wet sample at 2 psi. This is referred to as the "Wet Compressed Bulk" (WCB). The second measure is termed "Wet Springback Ratio" (WS), which is the ratio of the moist sample thickness at 0.025 psi at the end of the compression test (cycle D) to the thickness of the moist sample at 0.025 psi measured at the beginning of the test (cycle A). The third measure is the "Loading Energy Ratio" (LER), which is the ratio of loading energy in the second compression to 2 psi (cycle C) to that of the first compression to 2 psi (cycle B) during the sequence described above, for a wetted sample. The final wet bulk measured at the end of the test (at 0.025 psi) is termed the "final bulk" or "FB" value. When load is plotted as a function of thickness, loading energy is the area under the curve as the sample goes from an unloaded state to the peak load of that cycle. For a purely elastic material, the springback and loading energy ratio would be unity. Applicants have found that the three measures described here are relatively independent of the number of layers in the stack and serve as useful measures of wet resiliency. Also referred to herein is the "Compression Ratio", which is defined as the ratio of moistened sample thickness at peak load in the first compression cycle to 2 psi to the initial moistened thickness at 0.025 psi.

In carrying out the foregoing measurements of the wet compressive resiliency, samples should be conditioned for at least 24 hours under TAPPI conditions (50% RH, 73° F.). Specimens are die cut to 2.5"×2.5" squares. Conditioned sample weight should be near 0.4 g, if possible, and within the range of 0.25 to 0.6 g for meaningful comparisons. The target mass of 0.4 g is achieved by using a stack of 2 or more sheets if the sheet basis weight is less than 65 gsm. For example, for nominal 30 gsm sheets, a stack of 3 sheets will generally be near 0.4 g total mass. Compression measurements are performed using an Instron 4502 Universal Testing Machine interfaced with a 286 PC computer running Instron Series XII software (1989 issue) and Version 2 firmware. The standard "286 computer" referred to has an 80286 processor with a 12 MHz clock speed. The particular computer used was a Compaq DeskPro 286e with an 80287 math coprocessor and a VGA video adapter. A 1 kN load cell is used with 2.25" diameter circular platens for sample compression. The lower platen has a ball bearing assembly to allow exact alignment of the platens. The lower platen is locked in place while under load (30-100 lbf) by the upper platen to ensure parallel surfaces.

The upper platen must also be locked in place with the standard ring nut to eliminate play in the upper platen as load is applied.

Following at least one hour of warm-up after start-up, the instrument control panel is used to set the extensionometer to zero distance while the platens are in contact (at a load of 10-30 lb). With the upper platen freely suspended, the calibrated load cell is balanced to give a zero reading. The extensionometer and load cell should be periodically checked to prevent baseline drift (shirting of the zero points). Measurements must be performed in a controlled humidity and temperature environment, according to TAPPI specifications (50%±2% RH and 73° F.). The upper platen is then raised to a height of 0.2 in. and control of the Instron is transferred to the computer.

Using the Instron Series XII Cyclic Test software with a 286 computer, an instrument sequence is established with 7 markers (discrete events) composed of 3 cyclic blocks (instructions sets) in the following order:

Marker 1: Block 1
Marker 2: Block 2
Marker 3: Block 3
Marker 4: Block 2
Marker 5: Block 3
Marker 6: Block 1
Marker 7: Block 3.

Block 1 instructs the crosshead to descend at 1.5 in./min. until a load of 0.1 lb. is applied (the Instron setting is −0.1 lb., since compression is defined as negative force). Control is by displacement. When the targeted load is reached, the applied load is reduced to zero. Block 2 directs that the crosshead range from an applied load of 0.05 lb. to a peak of 8 lb. then back to 0.05 lb. at a speed of 0.4 in./min. Using the Instron software, the control mode is displacement, the limit type is load, the first level is −0.05 lb., the second level is −8 lb., the dwell time is 0 sec., and the number of transitions is 2 (compression, then relaxation); "no action" is specified for the end of the block.

Block 3 uses displacement control and limit type to simply raise the crosshead to 0.2 in. at a speed of 4 in./min., with 0 dwell time. Other Instron software settings are 0 in first level, 0.2 in second level, 1 transition, and "no action" at the end of the block.

When executed in the order given above (Markers 1-7), the Instron sequence compresses the sample to 0.025 psi (0.1 lbf), relaxes, then compresses to 2 psi (8 lbs.), followed by decompression and a crosshead rise to 0.2 in., then compress the sample again to 2 psi, relaxes, lifts the crosshead to 0.2 in., compresses again to 0.025 psi (0.1 lbf), and then raises the crosshead. Data logging should be performed at intervals no greater than every 0.02" or 0.4 lb. (whichever comes first) for Block 2 and for intervals no greater than 0.01 lb. for Block 1. Preferably, data logging is performed every 0.004 lb. in Block 1 and every 0.05 lb. or 0.005 in. (whichever comes first) in Block 2.

The results output of the Series XII software is set to provide extension (thickness) at peak loads for Markers 1, 2, 4 and 6 (at each 0.025 and 2.0 psi peak load), the loading energy for Markers 2 and 4 (the two compressions to 2.0 psi previously termed cycles B and C, respectively), the ratio of the two loading energies (second cycle/first cycle), and the ratio of final thickness to initial thickness (ratio of thickness at last to first 0.025 psi compression). Load versus thickness results are plotted on the screen during execution of Blocks 1 and 2.

In performing a measurement, the dry, conditioned sample is centered on the lower platen and the test is initiated. Following completion of the sequence, the sample is immediately removed and moisture (deionized water at 72-73° F.) is applied. Moisture is applied uniformly with a fine mist to reach a moist sample mass of approximately 2.0 times the initial sample mass (95-110% added moisture is applied, preferably 100% added moisture, based on conditioned sample mass; this level of moisture should yield an absolute moisture ratio of about 1.1 g. water/g. oven dry fiber—with oven dry referring to drying for at least 30 minutes in an oven at 105° C.). (For the uncreped throughdried materials of this invention, the moisture ratio could be within the range of 1.05 to 1.7 without significantly affecting the results). The mist should be applied uniformly to separated sheets (for stacks of more than 1 sheet), with spray applied to both front and back of each sheet to ensure uniform moisture application. This can be achieved using a conventional plastic spray bottle, with a container or other barrier blocking most of the spray, allowing only about the upper 10-20% of the spray envelope—a fine mist—to approach the sample. The spray source should be at least 10" away from the sample during spray application. In general, care must be applied to ensure that the sample is uniformly moistened by a fine spray. The sample must be weighed several times during the process of applying moisture to reach the targeted moisture content. No more than three minutes should elapse between the completion of the compression test on the dry sample and the completion of moisture application. Allow 45-60 seconds from the final application of spray to the beginning of the subsequent compression test to provide time for internal wicking and absorption of the spray. Between three and four minutes will elapse between the completion of the dry compression sequence and initiation of the wet compression sequence.

Once the desired mass range has been reached, as indicated by a digital balance, the sample is centered on the lower Instron platen and the test sequence is initiated. Following the measurement, the sample is placed in a 105° C. oven for drying, and the oven dry weight will be recorded later (sample should be allowed to dry for 30-60 minutes, after which the dry weight is measured).

Note that creep recovery can occur between the two compression cycles to 2 psi, so the time between the cycles may be important. For the instrument settings used in these Instron tests, there is a 30 second period (±4 sec.) between the beginning of compression during the two cycles to 2 psi. The beginning of compression is defined as the point at which the load cell reading exceeds 0.03 lb. Likewise, there is a 5-8 second interval between the beginning of compression in the first thickness measurement (ramp to 0.025 psi) and the beginning of the subsequent compression cycle to 2 psi. The interval between the beginning of the second compression cycle to 2 psi and the beginning of compression for the final thickness measurement is approximately 20 seconds.

The utility of a pad having a high Wet Compressed Bulk (WCB) value is obvious, for a wet material which can maintain high bulk under compression can maintain higher fluid capacity and is less likely to allow fluid to be squeezed out when it is compressed.

High Wet Springback Ratio values are especially desirable because a wet material that springs back after compression can maintain high pore volume for effective intake and distribution of additional fluid, and such a material can regain fluid during its expansion which may have been expelled during compression. If the material is unable to regain its bulk when the compressive force is released, its effectiveness for handling fluid is reduced.

High Loading Energy Ratio values in a material are also useful, for such a material continues to resist compression (LER is based on a measure of the energy required to compress a sample) at loads less than the peak load of 2 psi, even after it has been heavily compressed once. Maintaining such wet elastic properties is believed to contribute to the performance and feel of a wetted article made according to the present invention, including the general advantages accrued when a structure can maintain its pore volume when wet.

The tissue webs used in the present invention can exhibit one or more of the foregoing properties. More specifically, the tissue webs can have a Wet Compressed Bulk of about 6 cubic centimeters per gram or greater, more specifically about 7 cubic centimeters per gram or greater, more specifically about 8 cubic centimeters per gram or greater, and still more specifically from about 8 to about 13 cubic centimeters per gram. The Compression Ratio can be about 0.7 or less, more specifically about 0.6 or less, still more specifically about 0.5 or less, and still more specifically from 0.4 to about 0.7. Also, they can have a Wet Springback Ratio of about 0.6 or greater, more specifically about 0.7 or greater, more specifically about 0.85, and still more specifically from about 0.8 to about 0.93. The Loading Energy Ratio can be about 0.6 or greater, more specifically 0.7 or greater, more specifically still about 0.8 or greater, and most specifically from about 0.75 to about 0.9. Final bulk can be about 8 cubic centimeters per gram or greater or preferably about 12 centimeters per gram or greater.

As used herein, "void volume" refers to the volume of space occupied by a sample that does not comprise solid matter. When expressed as a percentage, it refers to the percentage of the overall volume occupied by the sample that does not comprise solid matter. For example, a rectilinear stack of tissue plies having dimensions of 10 cm×10 cm×1 cm (forming for a 1-cm thick pad) occupies a volume of 100 cubic centimeters (cc). If the stack has a mass of 6.4 grams and the solid matter of the stack consists of solids with an average density of 1.6 grams per cubic centimeter (g/cc), which is approximately the density of solid cellulose, then the solid phase of the stack has a solid volume of 4 cc, and the void volume of the stack is 96 cc, or, in terms of a percentage, it is 96%. The void volume of pads according to the present invention, when the pads are either dry or wet (e.g., fully saturated), can be about 50% or greater, more specifically about 70% or greater, more specifically about 80% or greater, more specifically still about 90% or greater, most specifically about 92% or greater, with exemplary ranges of from about 85% to about 99% or from 96% to 99%.

BRIEF DESCRIPTION OF THE DRAWINGS

A full and enabling disclosure of the present invention, including the best mode thereof to one of ordinary skill in the art, is set forth more particularly in the specification, including reference to the accompanying figure in which.

DETAILED DESCRIPTION

Figure 1:
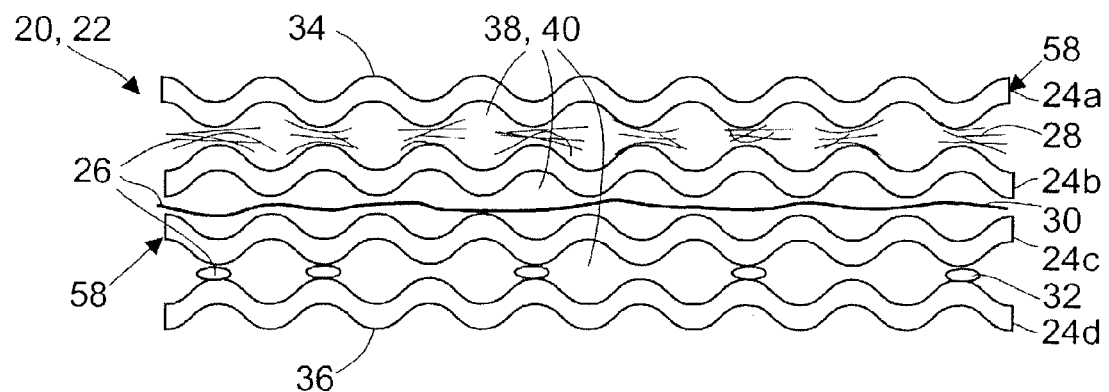
FIG. 1 is a cross-sectional view of one embodiment of a sponge-like pad made in accordance with the present invention.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

A low-cost, resilient sponge-like pad for cleaning and other applications has been developed comprising multiple layers of wet-resilient cellulosic webs joined together to provide unusual mechanical properties. Such properties can include compressive elastic properties when wet that are similar to a wetted sponge, such as a Wet Springback (hereinafter defined) of at least 0.6, a Loading Energy Ratio (hereinafter defined) of at least 0.6 or greater, and a Wet Compressed Bulk (hereinafter defined) of about 7 cubic centimeters per gram or greater. The pad can be incorporated in a variety of articles such as cleaning devices (e.g., a scrub pad for cleaning dishes, for washing walls, for cleaning household objects, for removing grout on tiles, and so forth), waxing pads, medical pads for removing biological fluids, and the like. Such articles can comprise a cover material attached to one or more surfaces of the resilient sponge-like pad. In some embodiments, the article comprises an interply-bonded stack of wet resilient tissue webs encased in a two-sided encasement having a relatively smooth surface and, on the opposing side of the sponge-like pad, an abrasive surface for scrubbing.

In general, the sponge-like pad can be made from a plurality of stacked paper webs. For most applications, the paper webs should have a substantial amount of wet strength and wet resilience when used in wet environments. The paper webs should also be textured having a three-dimensional structure. For instance, the paper webs can have an Overall Surface Depth (hereinafter defined) of greater than about 0.2 mm, and particularly greater than about 0.4 mm. In general, the paper webs can be formed in any suitable process.

The webs can be apertured, either individually or coapertured with each other or with a cover material. Any one or more of the tissue layers of the pad can be apertured, if desired. The cover, if present, can also be apertured.

In one embodiment, a sponge-like pad having an internal pore volume of over 50% comprises a plurality of layers of textured, wet resilient molded tissue such as uncreped, through-air dried tissue comprising over 20% high-yield fibers and added permanent wet strength agents. The pad can have an additional cover material on any surface intended for scrubbing or cleansing to serve as a sponge-like cleaning article. In one embodiment, the pad can be substantially encased within a heterogeneous cover such as a two-sided cover, i.e., a cover having different properties on the two opposing primary surfaces, where "primary surfaces" as used herein refers to the opposing surfaces of the pad or sponge-like cleaning article having the largest surface area, which are generally the surfaces most likely to be used for scrubbing or cleansing.

The cover can provide a soft, pliable, water-pervious material on one primary surface of the pad and an abrasive surface on the primary surface of the pad, or other combinations of material properties on any surface of the pad. The abrasive surface can be formed, for instance, from a nonwoven melt-spun web, such as a meltblown web or a spunbond web, that includes abrasive particles present at the surface of the web.

The soft layer can comprise a nonwoven such as a meltblown, a spunbond, a bonded carded web, or a tissue-based layer such as a layer of UCTAD tissue (including a portion of a Scott® towel having a colored print), VIVA® towel, and the like.

In another embodiment, the cover comprises an open network such as a scrim, a mesh, or honeycomb net, wherein the open voids passing directly through the cover occupy a substantial portion of the surface. For example, the percentage of the surface of the cover from a plan perspective that is occupied by open voids (allowing the pad to be visible through the open voids) can be 50% or greater, about 60% or greater, or about 75% or greater.

The cover can also comprise any textile material including woven fabrics of any kind, such as cotton cloths, nylon mesh, polyester fabrics, burlap, and the like. Any known cover material for commercially available wiping articles can also be used, including a layer of steel wool, finely slit films or foils such as metallized mylar, woven plastic ribbons, chamois, and the like. Composites of woven and nonwoven fabrics can be used as well.

The cover can be elastomeric or non-elastomeric. A non-elastomeric cover can nevertheless be substantially extensible in one or more directions due to the structure of the cover. For example, a flexible fish-net or honeycomb structure with high open area can be deformed in at least one direction in the plane of the cover in response to stress.

The pad with or without a cover can be used directly for cleaning or other purposes, or can incorporated as an element in a wide variety of products. For example, the pad of the present invention can be adapted for virtually any known use of a sponge. More specifically, the pad can be incorporated into window cleaning articles such as those comprising a sponge (for which the pad would be substituted, at least in part) and a squeegee blade held in cooperative association by restraining means, and further comprising a handle and optionally comprising a liquid reservoir and liquid applicator means to dispense a cleaning agent such as a glass cleaner. Examples of articles comprising a sponge (or other absorbent means) and squeegee which can be adapted for the present invention are given in U.S. Pat. No. 6,000,089, "Squeegee Having Sponge Washer with Replaceable Mesh Protector Apparatus," issued Dec. 14, 1999 to Renken; U.S. Pat. No. 5,864,913, "Window Cleaning Squeegee," issued Feb. 2, 1999 to Robertson et al.; U.S. Pat. No. 6,082,915, issued Jul. 4, 2000 to Kimmel; U.S. Pat. No. 5,343,586, issued Sep. 6, 1994 to Vosbikian; U.S. Pat. No. 4,152,807, issued May 8, 1979 to Smahlik; U.S. Pat. No. 5,054,945 issued Oct. 8, 1991 to Iggulden and Streck; U.S. Pat. No. 5,548,862 issued Aug. 27, 1996 to Curtis; U.S. Pat. No. 5,987,685, issued Nov. 23, 1999 to Lambert; and U.S. Pat. No. 5,920,942, issued Jul. 13, 1999 to Footer; U.S. Pat. No. 4,381,575, issued May 3, 1983 to Wendt; all of which are herein incorporated by reference in their entireties to the extent they are non-contradictory herewith.

Other devices for holding a sponge and connecting it to a handle are disclosed in U.S. Pat. No. 3,872,536 issued Mar. 25, 1975 to H. A. Siemund, and U.S. Pat. No. 6,044,513, issued Apr. 4, 2000 to Penn.

Referring to FIG. 1, a cross-section of one embodiment of a sponge-like pad 20 comprising a stack 22 of textured, wet-resilient tissue layers 24a-24d with each adjacent pair of tissue layers 24 joined by binder material 26 disposed therebetween made in accordance with the present invention is shown. In general, the stack 22 can include at least 3 plies, particularly at least 5 plies, and, in some applications, at least 10 plies. The binder material 26 is shown as binder fibers 28 joining tissue layers 24a and 24b, a binder film 30 joining tissue layers 24b and 24c, and non-fibrous binder deposits 32 joining layers 24c and 24d, wherein the binder deposits 32 can be spots of adhesive material, drops of hot melt material, and the like.

As shown, the binder material 26 forms bond areas between the adjacent tissue layers. The bond areas are selectively located where the highly textured paper webs contact each other. In general, the bond areas can take up from about 1% to about 80% of the surface area of one side of the web, more specifically from about 2% to about 40%, and most specifically from about 2% to about 20% of the surface area of one side of the web. By bonding the tissue layers together at selected locations, a substantial amount of void volume and bulk is created in the sponge-like pad 20.

Interply bonding of the stack of paper webs has been found to be especially helpful in improving the performance of the pad when used as a cleaning article. Bonding the layers together using a binder prevents significant slip or shear between plies during use (e.g., during scrubbing or wiping) and creates the feel of an integral article like a sponge rather than a stack of discrete webs. This is manifest in the ability of the interply-bonded pad to spring back more quickly into its initial shape after being creased, folded or squeezed, and to resist undesired slipping during scrubbing.

The stack 22 has a first primary surface 34 (which could be termed an upper surface) and a second primary surface 36 (which could be termed a lower surface) and a first lateral face 58 opposed to a second lateral face 60. Not shown are a front end and back end on the axis normal to the depicted plane of the cross-section. As stated above, the stacking of textured tissue layers 24a-d and the manner in which they are attached together contributes to the void spaces 38 in the stack 22. The total void space 38 of the stack 22 is a sum of interstitial space 40 between the tissue layers 24a-d and internal void space (not shown) within the tissue layers 24a-d, as well as any space contributed by apertures (not shown) or other openings within the tissue layers 24a-d. The interstitial voids 40 between the plies can occupy a percentage of the volume of the stack 22 of about 30% or greater, more specifically about 40% or greater, more specifically still about 50% or greater, and most specifically about 60% or greater. The total void space, on the other hand, can be greater than about 50%, particularly greater than about 70%, and, in some embodiments, greater than about 90%.

Figure 2:
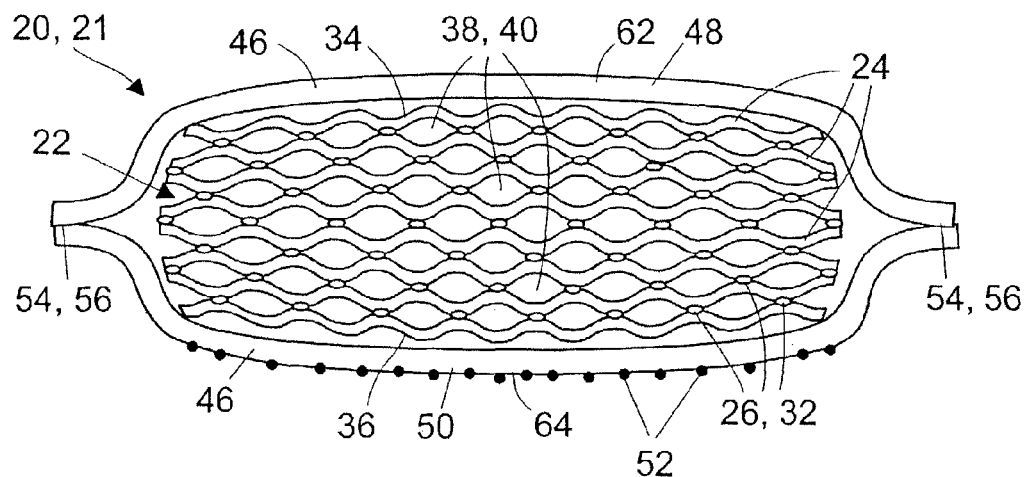
FIG. 2 is a view of another embodiment of a sponge-like pad made in accordance with the present invention.

FIG. 2 depicts a cross-section of an pad 20 comprising a two-sided cover 46 and stack 22 similar to that of FIG. 1 comprising wet resilient tissue layers 24 with interply bonding from binder material 26 in the form of binder deposits 32 joining the most elevated or depressed portions of each textured tissue web 24 with the adjacent tissue webs 24. The cover 46 comprises two joined portions, a first cover material 62 and a second cover material 64 joined at a seam 54 with thermal bonds 56 (though any known bonding method could be used, such as ultrasonic bonds, adhesive bonds, sewn threads, hook and loop mechanical fastening systems, snaps, rivets, staples, and the like). The second cover material 64 comprises an abrasive material 52 deposited on a portion of the second cover material 64 (alternatively, the second cover material 64 could intrinsically be abrasive rather than requiring additional abrasive material 52 to be deposited thereon).

As depicted, the seams 54 protrude away from the stack 22, but the seams 54 could comprise overlapping sections of the first cover material 62 and second cover material 64 that are substantially flush with the side of the stack 22, such as inverted seams. In another embodiment, the cover 46 could comprise a single layer of material that is bonded to itself in a seam 54 along only one side of the stack 22.

In general, first cover material 62 and second cover material 64 can be made from any suitable material that allows the flow of liquids therethrough, such as water and that can be used in wet environments. In the embodiment illustrated in FIG. 2, the first cover material 62 can be a soft or smooth layer. The layer can be made from, for instance, a meltblown web, a spunbond web, a bonded carded web, a paper web, or a laminate containing any of the above webs. When first cover material 62 is a paper web, the web can be a commercial paper towel, such as a SCOTT Towel or a VIVA towel. The web can be an uncreped or a creped through-air dried web, a creped or uncreped wet pressed web, and/or a print bonded creped web. In one embodiment, for instance, the first cover material 62 can be made from the same material at the tissue plies 24.

The second cover material 64, as shown in FIG. 2, includes an abrasive surface. In general, the second cover material 64 can be made from any suitable water pervious web that has abrasive particles attached to the surface. The cover material 64 can be made, for instance, from a meltblown web, a spunbond web, a bonded carded web, or a laminate including any of the above. The adhesive particles can be formed integral with the web or can be applied to the web after the web is formed and attached using an adhesive. Suitable abrasive particles that can be attached to the web include filler particles and microspheres.

Microspheres can be about 10 microns to 1 mm in diameter and typically have a shell thickness 1 to about 5 microns, while macrospheres (which can also be used in some embodiments) have diameters greater than about 1 mm. Such materials include microbeads of metal, glass, carbon, mica, quartz or other minerals, plastic such as acrylic or phenolic, including acrylic microspheres known as PM 6545 available from PQ Corporation of Pennsylvania, and hollow microspheres such as the cross-linked acrylate SunSpheres™ of ISP Corporation (Wayne, N.J.) and the related hollow spheres of U.S. Pat. No. 5,663,213, herein incorporated by reference; as well as expandable spheres such as Expancel® microspheres (Expancel, Stockviksverken, Sweden, a division of Akzo Nobel, Netherlands), and the like.

In one embodiment of the present invention, for instance, the second cover material 64 can be made from a nonwoven meltspun web, such as a meltblown web treated with a meltblown "shot". Meltblown shot is a coarse nonuniform layer applied in a meltblown process deliberately operated to generate random globules of the polymer (typically polypropylene or another thermoplastic) interconnected with strands. The shot may be distinctly colored to make the abrasive element readily visible. The meltblown web can have a basis weight of from about 10 gsm to about 20 gsm. It should be understood, however, that heavier webs can be used.

Methods of producing abrasive webs, including webs with meltblown shot, are disclosed in U.S. Pat. No. 4,659,609, "Abrasive Web and Method of Making Same," issued Apr. 21, 1987 to Lamers et al. and U.S. Pat. No. 4,833,003, "Uniformly Moist Abrasive Wipes," issued May 23, 1989 to Win et al., both of which are herein incorporated by reference. Such methods include meltblowing a polymer melt onto the meltblown supporting web such that the meltblown fibers and shotty deposits are at a temperature at or above the polymer softening point and remain sufficiently semimolten (hot and fusible) to thermally bond to the supporting web. By making a composite web in this manner, the resulting top layer of meltblown fibers and shotty deposits, which fibers are thicker than conventional meltblown fibers, intimately bond to the supporting meltblown web and harden into an abrasive surface. The resulting layered web thus exhibits the strength and absorbent characteristics of the supporting web and the abrasiveness of the meltblown layer.

As described in the above-mentioned U.S. Pat. No. 4,659,609, a number of variables can be manipulated to achieve the desired abrasive layer characteristics. These variables include the characteristics of the polymer, the temperature of the melt, the design of the meltblowing die tip, the denier of the extruded melt and resulting fibers, the melt flow rate, the meltblowing air temperature and flow rate, the distance between the die tip and the supporting web, the basis weight of the meltblown layer, and the nature of the supporting web. However, those skilled in the art of manufacturing nonwoven webs will readily be able to manipulate these variables as necessary to achieve semi-molten meltblown fibers and shotty deposits capable of bonding to the supporting web to form the abrasive surface.

The meltblown abrasive layer intimately thermally bonded to the meltblown supporting layer can have a basis weight of from about 1 to about 45 gsm, such as from about 3 to about 20 gsm and can comprise coarse fibers or particles with a diameter from about 40 to about 500 micrometers. The abrasive layer also contains shotty deposits (shot) which can be of much larger size (diameter) than that of the fibers. Shotty deposits typically range in size from about 40 to about 3000 micrometers or larger. It will be appreciated that the term "diameter" is used loosely to describe the general size of the fiber diameter and the shotty deposit size as if they were perfectly round. In one embodiment, the abrasive layer can consist essentially of coarse fibers and/or shotty deposits to maximize the abrasive effect. The relative proportion of shotty deposits and large diameter fibers is a function of the processing conditions. Both provide abrasive characteristics. Suitable polymer materials can include, without limitation, polypropylene, polyethylene, nylon, polyethers, ethylene vinyl acetate, polyvinyl chloride, polyesters, and copolymers thereof.

As opposed to attaching abrasive particles or fibers to the web, in another embodiment, the second cover material 64 can be made from an intrinsically abrasive nonwoven material. Such materials include, for instance, nonwoven webs made from coarse PET fibers or polypropylene fibers with properties analogous to those found in SCOTCHBRITE pads of 3M Corp. (Minneapolis, Minn.) or other cleaning structures. Coarse fibers are typically stiff fibers having a fiber diameter of from about 30 microns to about 2 mm, more specifically from about 50 microns to about 1 mm, and most specifically from about 70 microns to about 500 microns. In another embodiment, a towel or paper web containing coarse fibers and having an abrasive texture can also be used. Such paper webs include webs containing high-yield softwood fibers throughdried on a coarsely textured fabric offering sharp peaks and valleys and further treated with bonding agents or internal binder fibers.

In still another embodiment of the present invention, one or both of the cover materials can be made from a material having an open network. Such materials include a scrim, a mesh, a net such as a honeycomb net, an open-cell foam or apertured foam layer, a metal mesh such as a foil mesh or mesh of metallized plastic film, or an apertured web or laminate. These materials can be made from synthetic polymers or can be made from paper making fibers. For example, a scrim material can be made from polymer yarns, such as polypropylene yarns. In this embodiment, the open network materials can have open voids that occupy a substantial portion of the surface. For instance, the percentage of the surface of the cover material that is occupied by open voids can be greater than about 50%, particularly greater than about 60%, and more particularly greater than about 75% of the surface area of the material. These open void materials can inherently have good scrubbing properties. Thus, the use of abrasive particles may not be necessary.

Other materials that can have an open network include meltblown webs. In particular, meltblown webs can be made with relatively large fiber diameters that create webs having an open pore structure and intrinsic abrasive properties. For example, the meltblown web can have fibers having a diameter of greater than about 0.1 mm, particularly greater than about 0.2 mm, and more particularly greater than about 0.3 mm. The meltblown material can be made from various polymers, such as polypropylene.

In another embodiment of the present invention, the cover material can be formed directly on the outer layers of the paper web that make up the sponge-like pad. For example, a meltspun layer, such as a meltblown layer or a spunbond layer, can be formed directly upon a paper web used to form the sponge-like pad. The meltspun web can have intrinsic abrasive properties or can include abrasive particles. By being formed directly on the paper web, the meltspun web can be made integral to the product. Specifically, in some embodiments, by being formed directly on the paper web, the meltspun layer will bond to the paper web without the use of an adhesive. In this embodiment, the meltspun layer is formed by depositing molten or uncured polymer directly onto the paper web, and then allowing the polymer to harden. In another embodiment, a photocurable resin is applied by extrusion or other techniques in uncured form to the surface of a tissue web, and then photocured to yield an abrasive cover. Exemplary photocurable resins are disclosed in U.S. Pat. No. 5,514,523, issued to Trokhan et al.

If it is desirable to increase the adhesion properties of the cover material, a tackifier can be applied to the surface of the cover. A tackifier can be, for instance, a polymer, such as a block copolymer. A block copolymer can be, for instance, a KRATON polymer available from The Shell Oil Company. Suitable KRATON polymers include KRATON G6638, KRATON G6610, and KRATON G2760.

Alternatively, the outer cover can be made from a two-bank meltspun system in which a first layer containing finer and tackier fiber from an adhesive or a low viscosity polymer is first formed followed by a second layer comprising an abrasive polymer net made from, for instance, the above-described KRATON polymers. The two-bank system can be used to form a meltblown web. The diameter of the meltblown fibers can be controlled by adjusting the flow rate of the molten polymer and web speed as well as air pressure and other parameters.

When a cover 46 is present, the cover can include one or more materials applied to one or more surfaces of the pad. In embodiments in which the cover substantially encases the pad and includes two or more layers of one or more materials joined together, the bonding should be done in a manner that prevents premature failure of the cover during use. The cover materials can be bonded together using thermal bonding, ultrasonic bonding, adhesive bonding, or stitching. When the cover materials are thermally bonded together, improved bonding and durability has been found with thermal bonds of spunbond to meltblown (both creped spunbond and uncreped spunbond), spunbond to spunbond, and meltblown to paper webs, such as paper towels.

In one embodiment of the present invention, the sponge-like pad 20 as shown in FIG. 1 or FIG. 2 can include a water impervious barrier material. The barrier material may be placed on one side of the internal pad, may pass through a portion of the internal pad, or may be used as a cover material for the pad. When present, the barrier material maintains dryness on one side of the pad while the other side is wetted. This may be useful when small quantities of a cleaning compound are used (e.g., a furniture polish, a window washer, or a harsh agent such as an oven cleaning agent), wherein wetting the entire pad is undesirable. In one embodiment, the barrier material may be removable.

As shown in FIG. 1, the barrier material, in one embodiment, can be a film 30. It should be understood, however, that any suitable water impermeable material can be used. For instance, suitable moisture barrier materials include films, wovens, nonwovens, laminates, or the like. The barrier material can be a liquid impermeable web or sheet of plastic film such as polyethylene, polypropylene, polyvinylchloride or similar material.

Figure 3:
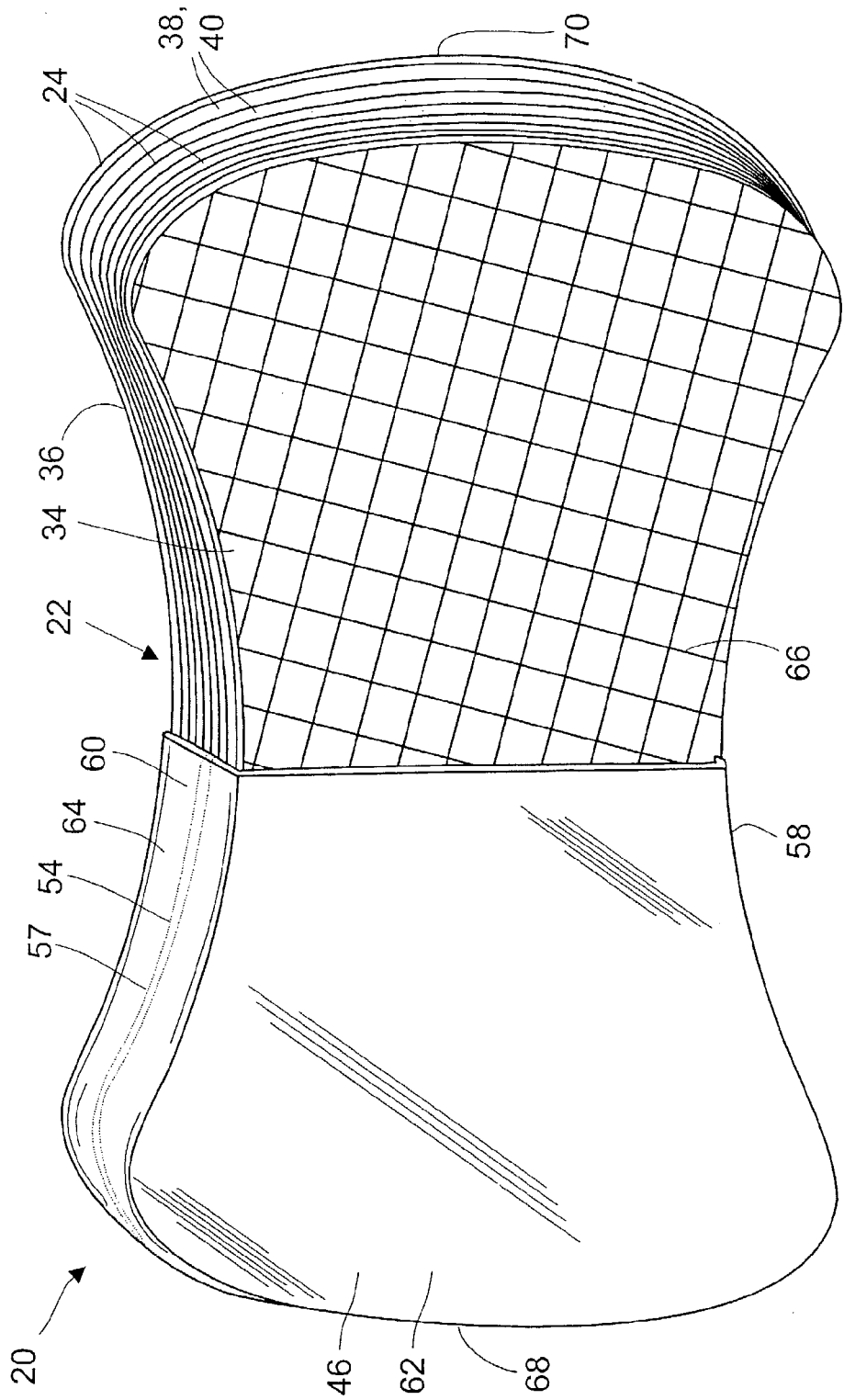
FIG. 3 is a perspective view with cutaway portions of another embodiment of a sponge-like pad made in accordance with the present invention.

FIG. 3 is a perspective view of a pad 20 comprising a two-sided cover 46 and stack 22 of 10 wet resilient tissue layers 24, depicted as textured with a rectilinear grid 66 of elevated regions. The rectilinear grid 66 can be formed into the paper web during, for instance, a throughdrying process in which the paper web is pressed against a throughdrying fabric. The cover 46 is cut away to show the interior stack 22, which has a first primary surface 34 and an opposing second primary surface 36. The cover 46 comprises a first cover material 62 and a second cover material 64 joined together in a seam 54 with ultrasonic bonds 57 at least along the first lateral face 58 and second lateral face 60 of the pad 22 and optionally along the front end 68 and rear end 70 of the pad 22. The first cover material 62 neighboring the first primary surface 34 of the pad 22 can be a liquid pervious material or comprise pores in selected regions to render it liquid pervious. It can further comprise abrasive material (not shown) if desired.

As shown in FIG. 3, the pad 20 has a dog bone shape. It should be understood, however, that pad 20 can have any suitable shape. For instance, the pad can be rectilinear in shape, can have a rectangular shape, an oval shape, a circular shape, a skewed parallelogram shape, and the like. Further, the various layers of the paper web contained in the pad can vary in size to give a trapezoidal cross-section. The layers of the pad also need not be flat and parallel, but can be backed into a variety of curvilinear shapes, such as a cylinder, a semicircle, a cone, and the like, possibly for use in cleaning surfaces or openings of non-rectilinear shapes.

Figure 4:
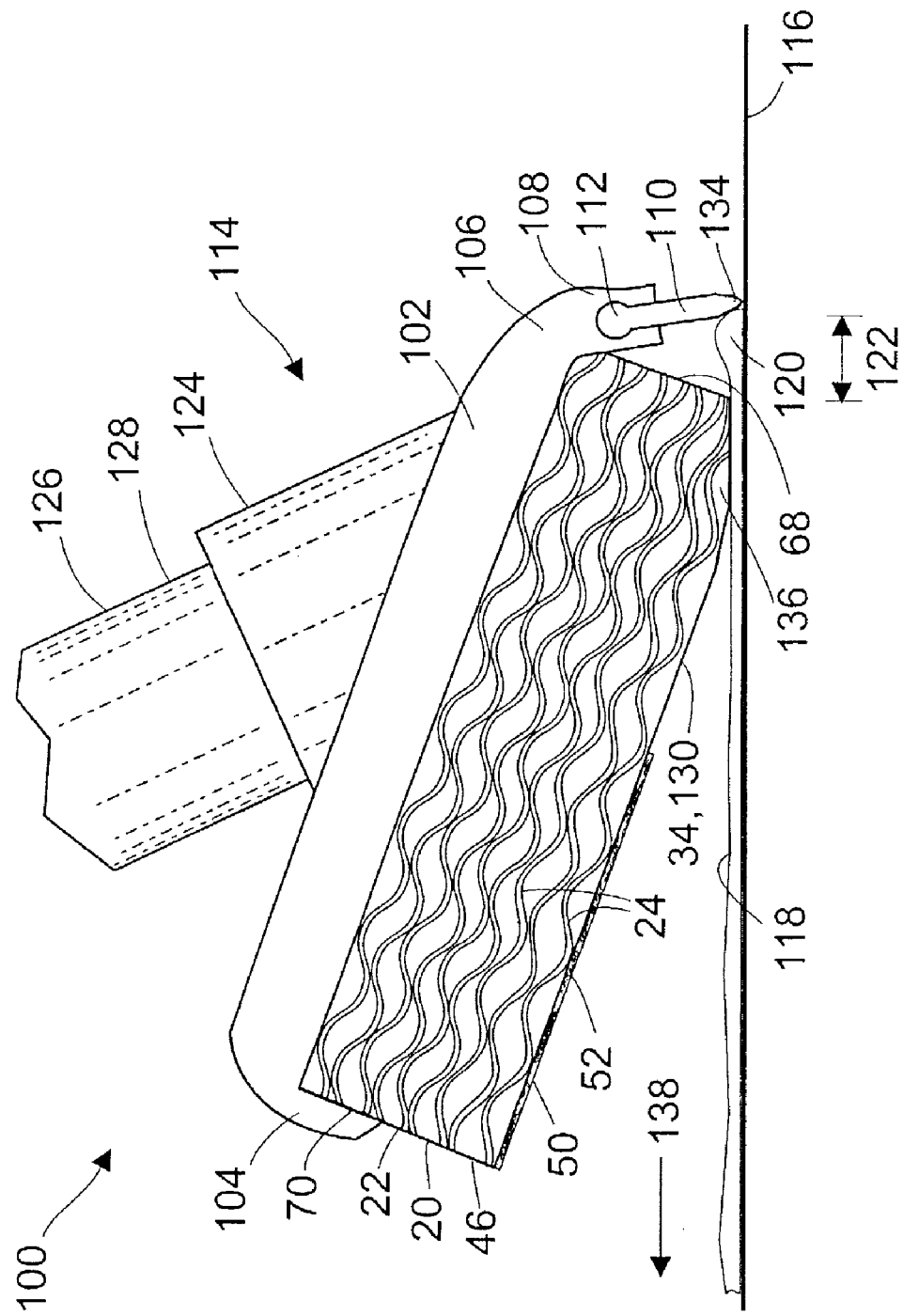
FIG. 4 is a cross-sectional view of a cleaning tool made in accordance with the present invention.

FIG. 4 depicts a hand-held cleaning article 100 shown as a mop, though it could be adapted to serve as a window cleaner or other cleaning device. It comprises a pad 20 made according to the present invention having a stack 22 of tissue layers 24 joined by durable, wet resilient binding material (not shown) and partially encased in a cover 46 having an abrasive section 50 with abrasive material 52 for scrubbing. The abrasive section 50 can be situated on any portion of the cleaning article 100 as desired, such as on the front end 68 of the pad 20, the read end 68 of the pad 20, or over the front section of the first major surface 34 of the pad or any part of that surface.

The cleaning article 100 comprises a handle 126 coupled to a head assembly 114. The head assembly 114 includes a head 102 on which the pad 20 is mounted between the back section 104 and the front section 106 of the head 102 (though the pad 20 could be mounted to the head 102 by any known method, including methods that do not require the presence of back section 104 as shown). The head 102 includes a wiper mount 108, which can hold a wiper 110 mounted in a recess 112, such as a resilient squeegee blade. Any other known mounting method could be used instead, such as a connection, a clamp, a spring-loaded mount, adhesive means, and the like. The head 102 also includes a coupling 124 to hold the handle 126 by its coupling end 128, which is opposite its grip end (not shown). The head 102 can be made of metal, plastic, or any other suitable material that can hold the pad 20 and wiper 110 in a rigid relationship, although multi-part head assemblies that can be disassembled or adjusted are also possible. Note that the interrelationship between the pad 20, handle 126, and wiper 110 can also be maintained without being directly connected to the head 102 (e.g., the wiper 110 could be connected to the handle 126 via an additional part). It is conventional to think of the pad 20 as being on the bottom of the cleaning article 100, and the grip end of the handle 126 as being at the back of the cleaning article 100.

Generally, the coupling 124 holds the handle 126 at an angle with respect to a primary working surface 130 of the pad 20, which can be the first major surface 34 of the pad 20. The wiper mount 108 in the front section 106 head 102 holds the wiper 110 in a position somewhat in front of the front end 68 of the pad 20.

The handle 126 can be a telescoping handle with two or more elongated portions (not shown) and a lock ring or other locking mechanism (not shown). The handle 126 can also hold reservoirs of cleaning fluid (not shown) and be attached to applicator means to apply a cleaning fluid as a spray or by flow into the pad 20.

In operation, referring to FIG. 4, if cleaning article 100 is used as a mop, the user could begin by mopping the cleaning surface 116 (a floor in this case) in the usual manner. The wiper 110 generally does not touch the cleaning surface 116 during mopping because its working edge 134 is positioned somewhat above the cleaning surface 116 when primary working surface 130 of the pad 20 is held against and parallel to the cleaning surface 116. This will prevent the wiper 110 from interfering with the mopping operation. During mopping or other modes of cleaning, a liquid 118 is applied to the cleaning surface 116. Liquid application can be by spraying or other means, or can be applied by applying liquid first to the pad 20 after which it can be expressed onto the cleaning surface 116 during mopping or other cleaning actions. Once the user has finished mopping a portion of the cleaning surface 116, the user can wipe that portion with the working edge 134 of the wiper 110. The user first tilts the handle 126 upward until the working edge contacts the cleaning surface 116, and then draws the wiper 110 towards him or herself in the direction 138 shown to wipe the liquid 118 off of the cleaning surface 116. During this operation, the user will hold the mop with a larger, but still acute, average angle between the cleaning article 100 and the cleaning surface 116, compared with the angle used during mopping.

A portion 136 of the pad 20 beneath the front section 106 of the head 102 is slightly compressed during drying. As the user draws the pad 20 along, that portion of the pad 20 will be pulled over the liquid 118 on the cleaning surface 116, and may absorb some or most of it. Substantially all of the remaining liquid 118 will be wiped by the wiper 110 and will form a small pool 120 in the gap 122 that separates the wiper 110 from the front end 68 of the pad 20. The pad 20 will wick the liquid in this pool 120 into the pad 20 as the user pulls the cleaning article 100 in the direction 138 shown, and thereby leave the cleaning surface 116 relatively dry at the end of the stroke.

Because the front end 68 of the pad 20 wicks away the liquid 118, the use of the cleaning article 110 represents an advantage over separate use of a mop and a squeegee. If a squeegee were used after mopping, it would typically accumulate large pools of water at the end of its stroke and this water would have to be removed from the floor. By mopping as described above, however, the water can simply be wrung out of the pad 20 by any known means. It is also contemplated that somewhat different wiper materials and positions may be used to achieve good results in different conditions.

In one embodiment, fluid is expelled from the lower portions of the pad 20 to wet and clean the cleaning surface 116, after which the wiper 110 collects the fluid into the pool 120 from which it can be wicked by relatively dryer upper portions of the pad 20, allowing cleaning and fluid removal to be done in a single stroke in the direction 138 shown.

Determining what the actual desired angles and dimensions should be for components of the cleaning article 100 can be accomplished using well known ergonomic methods, or can be based upon simple testing. It is also possible to design a cleaning article 100 where the angles between the pad 20, handle 126, and head 102 are adjustable, allowing each user to configure the cleaning article 100 according to his or her height, arm length, and individual preferences.

In an alternative embodiment, the wiper 110 could be mounted on the back section 104 of the head 102, or wipers 110 could be mounted on both the front section 106 and back section 104 of the head 104. Different types of wipers 110 can also be used, such as multi-blade squeegees.

The invention can be applied to a wide variety of mops and other known devices. For example, a mop employing principles according to the invention can employ a butterfly, cam-shaped rollers, or other known mechanisms to allow the user to wring out the pad 20. Certain of the novel and unobvious features of the invention could also be applied to other cleaning implements such as hand mops.

The paper web that can be stacked and bonded together to form the sponge-like pad of the present invention will now be described in greater detail. As described above, any suitable paper web can be used in the present invention as long as the paper web is wet resilient. The paper web should also be highly textured. For instance, the web should have an Overall Surface Depth of at least 0.2 mm and particularly from about 0.4 mm to about 0.8 mm.

The paper web used to form the pad of the present invention can be made by any method known in the art. Airlaid webs can be used, such as those made with DanWeb or Kroyer equipment. The web can be wetlaid, such as web formed with known papermaking techniques wherein a dilute aqueous fiber slurry is disposed on a moving wire to filter out the fibers and form an embryonic web which is subsequently dewatered by combinations of units including suction boxes, wet presses, dryer units, and the like. Examples of known dewatering and other operations are given in U.S. Pat. No. 5,656, 132 to Farrington et al. Capillary dewatering can also be applied to remove water from the web, as disclosed in U.S. Pat. Nos. 5,598,643 issued Feb. 4, 1997 and 4,556,450 issued Dec. 3, 1985, both to S. C. Chuang et al.

Drying operations can include drum drying, throughdrying, steam drying such as superheated steam drying, displacement dewatering, Yankee drying, infrared drying, microwave drying, radiofrequency drying in general, and impulse drying, as disclosed in U.S. Pat. Nos. 5,353,521, issued Oct. 11, 1994 to Orloff; and 5,598,642, issued Feb. 4, 1997 to Orloff et al. Other drying technologies can be used, such as those described by R. James in "Squeezing More out of Pressing and Drying," *Pulp and Paper International*, Vol. 41, No. 12 (December 1999), pp. 13-17. Displacement dewatering is described by J. D. Lindsay, "Displacement Dewatering To Maintain Bulk," *Paperi Ja Puu*, vol. 74, No. 3, 1992, pp. 232-242. In drum drying, the dryer drum can also be a Hot Roll Press (HRP), as described by M. Foulger and J. Parisian in "New Developments in Hot Pressing," *Pulp and Paper Canada*, Vol. 101, No. 2, February., 2000, pp. 47-49. Other methods employing differential gas pressure include the use of air presses as disclosed U.S. Pat. No. 6,096,169, "Method for Making Low-Density Tissue with Reduced Energy Input," issued Aug. 1, 2000 to Hermans et al.; and U.S. Pat. No. 6,143,135, "Air Press For Dewatering A Wet Web," issued Nov. 7, 2000 to Hada et al. Also relevant are the paper machines disclosed in U.S. Pat. No. 5,230,776 issued Jul. 27, 1993 to I. A. Andersson et al.

A moist fibrous web can also be formed by foam forming processes, wherein the fibers are entrained or suspended in a foam prior to dewatering, or wherein foam is applied to an embryonic web prior to dewatering or drying. Exemplary methods include those of U.S. Pat. Nos. 5,178,729, issued Jan. 12, 1993 to Janda; and 6,103,060, issued Aug. 15, 2000 to Munerelle et al., both of which are herein incorporated by reference.

For tissue webs, both creped and uncreped methods of manufacture can be used. Uncreped tissue production is disclosed in U.S. Pat. No. 5,772,845 to Farrington, Jr. et al., herein incorporated by reference. Creped tissue production is disclosed in U.S. Pat. No. 5,637,194 to Ampulski et al., U.S. Pat. No. 4,529,480 to Trokhan, U.S. Pat. No. 6,103,063, issued Aug. 15, 2000 to Oriaran et al., and U.S. Pat. No. 4,440,597 to Wells et al, all of which are herein incorporated by reference in a manner consistent herewith.

For either creped or uncreped methods, embryonic tissue webs may be imprinted against a deflection member prior to complete drying. Deflection members have deflection conduits between raised elements, and the web is deflected into the deflection member by an air pressure differential to create bulky domes, while the portions of the web residing on the surface of the raised elements can be pressed against the dryer surface to create a network of pattern densified areas offering strength. Deflection members and fabrics of use in imprinting a tissue, as well as related methods of tissue manufacture, are disclosed in the following: in U.S. Pat. No. 5,855,739, issued to Ampulski et al. Jan. 5, 1999; U.S. Pat. No. 5,897,745, issued to Ampulski et al. Apr. 27, 1999; U.S. Pat. No. 4,529, 480, issued Jul. 16, 1985 to Trokhan; U.S. Pat. No. 4,514,345, issued Apr. 30, 1985 to Johnson et al.; U.S. Pat. No. 4,528, 239, issued Jul. 9, 1985 to Trokhan; U.S. Pat. No. 5,098,522, issued Mar. 24, 1992; U.S. Pat. No. 5,260,171, issued Nov. 9, 1993 to Smurkoski et al.; U.S. Pat. No. 5,275,700, issued Jan. 4, 1994 to Trokhan; U.S. Pat. No. 5,328,565, issued Jul. 12, 1994 to Rasch et al.; U.S. Pat. No. 5,334,289, issued Aug. 2, 1994 to Trokhan et al.; U.S. Pat. No. 5,431,786, issued Jul. 11, 1995 to Rasch et al.; U.S. Pat. No. 5,496,624, issued Mar. 5, 1996 to Stelljes, Jr. et al.; U.S. Pat. No. 5,500,277, issued Mar. 19, 1996 to Trokhan et al.; U.S. Pat. No. 5,514,523, issued May 7, 1996 to Trokhan et al.; U.S. Pat. No. 5,554,467, issued Sep. 10, 1996, to Trokhan et al.; U.S. Pat. No. 5,566,724, issued Oct. 22, 1996 to Trokhan et al.; U.S. Pat. No. 5,624, 790, issued Apr. 29, 1997 to Trokhan et al.; U.S. Pat. No. 6,010,598, issued Jan. 4, 2000 to Boutilier et al.; and U.S. Pat. No. 5,628,876, issued May 13, 1997 to Ayers et al., as well as commonly owned application Ser. No. 09/705,684 by Lindsay et al., all of which are herein incorporated by reference in a manner consistent herewith.

The fibrous web is generally a random plurality of papermaking fibers that can, optionally, be joined together with a binder. Any papermaking fibers, as previously defined, or mixtures thereof may be used, such as bleached fibers from a kraft or sulfite chemical pulping process. Recycled fibers can also be used, as can cotton linters or papermaking fibers comprising cotton. In one embodiment, the fibers may be predominantly hardwood, such as at least 50% hardwood or about 60% hardwood or greater or about 80% hardwood or greater or substantially 100% hardwood. In another embodiment, the web is predominantly softwood, such as at least about 50% softwood or at least about 80% softwood, or about 100% softwood.

For some applications, high brightness may be desired especially when the pad does not include a cover material. Thus the papermaking fibers or the resulting paper of the present invention can have an ISO brightness of about 60 percent or greater, more specifically about 80 percent or greater, more specifically about 85 percent or greater, more specifically from about 75 percent to about 90 percent, more specifically from about 80 percent to about 90 percent, and more specifically still from about 83 percent to about 88 percent.

The fibrous web of the present invention may be formed from a single layer or multiple layers. Both strength and softness are often achieved through layered tissues, such as those produced from stratified headboxes wherein at least one layer delivered by the headbox comprises softwood fibers while another layer comprises hardwood or other fiber types. Layered structures produced by any means known in the art are within the scope of the present invention, including those disclosed by Edwards et al. in U.S. Pat. No. 5,494,554. In the case of multiple layers, the layers are generally positioned in a juxtaposed or surface-to-surface relationship and all or a portion of the layers may be bound to adjacent layers. The paper web may also be formed from a plurality of separate paper webs wherein the separate paper webs may be formed from single or multiple layers.

The basis weight of any tissue layer in the stack can any practical value, such as from about 10 gsm to 200 gsm, specifically from about 15 gsm to 100 gsm, more specifically from about 15 gsm to about 60 gsm, and most specifically from about 25 gsm to about 40 gsm.

In one embodiment of the present invention, the paper web that is used to form the sponge-like pad is a textured tissue web which has been dried in a three-dimensional state. For instance, in this embodiment, the web is dried such that the hydrogen bonds joining the fibers are substantially formed while the web is not in a flat, planar state, as is the case with conventional Yankee drying of tissue, but is formed while the web is on a highly textured throughdrying fabric or other three-dimensional substrate, as disclosed in commonly owned U.S. patent application Ser. No. 08/912,906, "Wet Resilient Webs and Disposable Articles Made Therewith," filed Aug. 15, 1997 by Chen et al.; U.S. Pat. No. 5,672,248 issued on Sep. 30, 1997 to Wendt et al.; U.S. Pat. No. 5,656,132 issued on Aug. 12, 1997 to Farrington et al.; U.S. Pat. No. 6,120,642, issued on Sep. 19, 2000 to Lindsay and Burazin, U.S. Pat. No. 6,096,169, issued on Aug. 1, 2000 to Hermans et al.; U.S. Pat. No. 6,197,154, issued on Mar. 6, 2001 to Chen et al.; and, U.S. Pat. No. 6,143,135, issued on Nov. 7, 2000 to Hada et al., all of which are herein incorporated by reference in their entireties.

In contrast to webs that are given a three-dimensional structure by embossing or other processes applied to a substantially dry web, the webs used to produce the present invention are substantially textured by molding prior to drying to increase wet resiliency. A flat, dry web (creped or uncreped) that is then embossed may have high bulk when dry, but as the embossed fibers are wetted, they swell and straighten out, tending to return the web to the geometry defined by the interfiber hydrogen bonds that formed as the web dried. For traditional tissue, the drying of the web occurs on a Yankee dryer as the web is in a flat, dense state, and thus upon wetting, the web tends to collapse even when highly embossed. such that the webs do not tend to collapse into a flat state when wetted with water, but maintain high bulk and an ability to spring back after compression even when wet. The high texture of the webs in a stacked arrangement provides significant interstitial void space between adjacent plies to permit excellent water absorbency.

Figure 5:
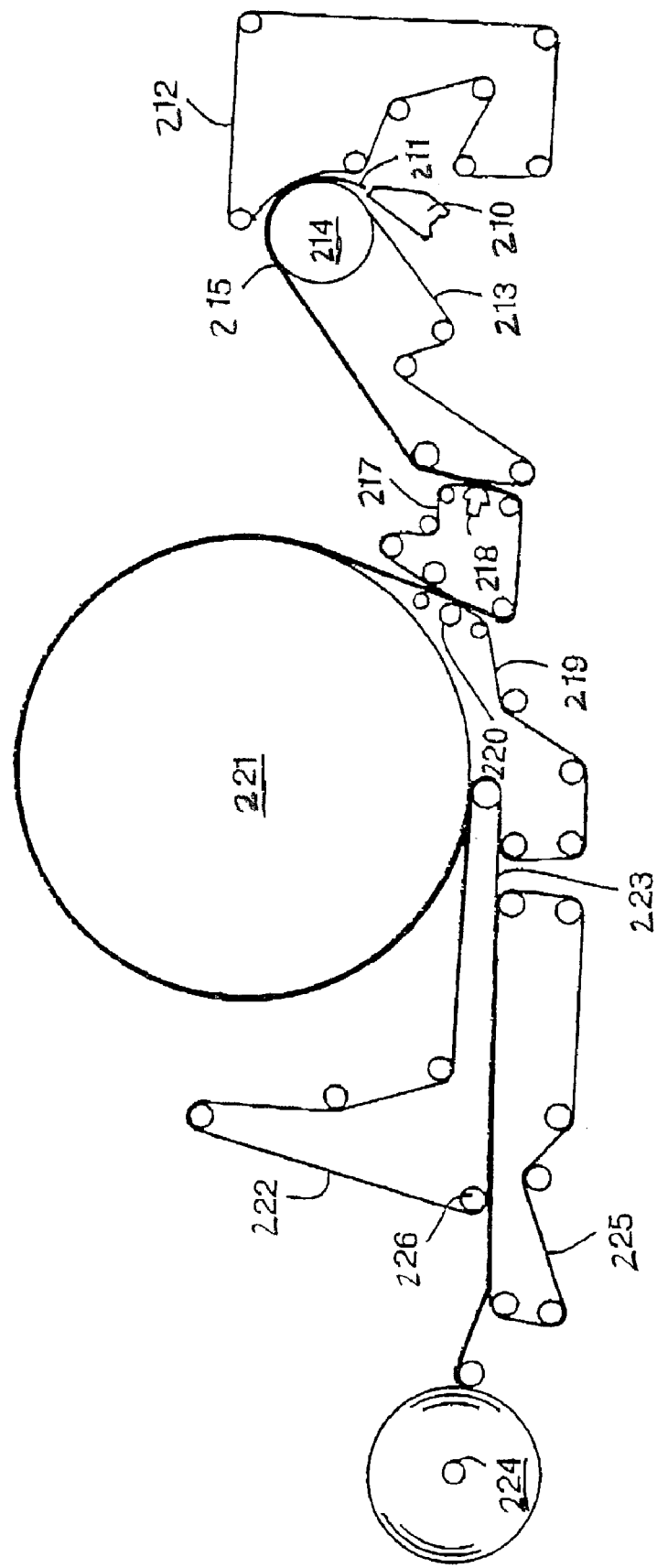
FIG. 5 is a diagrammatical view of one embodiment of a process for producing an uncreped throughdried paper web that may be used in the products of the present invention.

Referring to FIG. 5, shown is a method for making throughdried paper sheets in accordance with this invention. (For simplicity, the various tensioning rolls schematically used to define the several fabric runs are shown but not numbered. It will be appreciated that variations from the apparatus and method illustrated in FIG. 5 can be made without departing from the scope of the invention). Shown is a twin wire former having a layered papermaking headbox 210 which injects or deposits a stream 211 of an aqueous suspension of papermaking fibers onto the forming fabric 213 which serves to support and carry the newly-formed wet web downstream in the process as the web is partially dewatered to a consistency of about 210 dry weight percent. Additional dewatering of the wet web can be carried out, such as by vacuum suction, while the wet web is supported by the forming fabric.

The wet web is then transferred from the forming fabric to a transfer fabric 217 traveling at a slower speed than the forming fabric in order to impart increased stretch into the web. This is commonly referred to as a "rush" transfer. Preferably the transfer fabric can have a void volume that is equal to or less than that of the forming fabric. The relative speed difference between the two fabrics can be from 0-60 percent, more specifically from about 10-40 percent. Transfer is preferably carried out with the assistance of a vacuum shoe 218 such that the forming fabric and the transfer fabric simultaneously converge and diverge at the leading edge of the vacuum slot.

The web is then transferred from the transfer fabric to the throughdrying fabric 219 with the aid of a vacuum transfer roll 220 or a vacuum transfer shoe, optionally again using a fixed gap transfer as previously described. The throughdrying fabric can be traveling at about the same speed or a different speed relative to the transfer fabric. If desired, the throughdrying fabric can be run at a slower speed to further enhance stretch. Transfer is preferably carried out with vacuum assistance to ensure deformation of the sheet to conform to the throughdrying fabric, thus yielding desired bulk and appearance. Suitable throughdrying fabrics are described in U.S. Pat. No. 5,429,686 issued to Kai F. Chiu et al., which is incorporated by reference.

The level of vacuum used for the web transfers can be from about 3 to about 15 inches of mercury (75 to about 380 millimeters of mercury), preferably about 5 inches (125 millimeters) of mercury. The vacuum shoe (negative pressure) can be supplemented or replaced by the use of positive pressure from the opposite side of the web to blow the web onto the next fabric in addition to or as a replacement for sucking it onto the next fabric with vacuum. Also, a vacuum roll or rolls can be used to replace the vacuum shoe(s).

While supported by the throughdrying fabric, the web is final dried to a consistency of about 94 percent or greater by the throughdryer 221 and thereafter transferred to a carrier fabric 222. The dried basesheet 223 is transported to the reel 224 using carrier fabric 222 and an optional carrier fabric 225. An optional pressurized turning roll 226 can be used to facilitate transfer of the web from carrier fabric 222 to fabric 225. Suitable carrier fabrics for this purpose are Albany International 84M or 94M and Asten 959 or 937, all of which are relatively smooth fabrics having a fine pattern. Although not shown, reel calendering or subsequent off-line calendering can be used to improve the smoothness and softness of the basesheet.

Once formed, the throughdried web, more specifically the uncreped throughdried web, can have a density of about 0.3 grams per cubic centimeter or less and a three dimensional surface having an Overall Surface Depth of about 0.10 mm or greater. The basis weight of the web can be about 10 gsm or greater, and particularly from about 50 gsm to about 60 gsm.

In order to improve wet resiliency, the paper web can contain wet resilient fibers, such as high-yield fibers. High-yield fibers include, for instance, thermomechanical pulp, such as bleached chemithermomechanical pulp (BCT&P). The amount of high-yield pulp fibers present in the sheet can vary depending upon the particular application. For instance, the high-yield pulp fibers can be present in an amount of about 10 dry weight percent or greater, or specifically, about 15 dry weight percent or greater, more specifically, about 30 dry weight percent or greater, still more specifically about 50 dry weight percent or greater, and still more specifically from about 20 to about 100%. For layered sheets, the same amounts can be applied to one or more individual layers. Because high-yield pulp fibers are generally less soft than other paper making fibers, in some applications it is advantageous to incorporate them into the middle of the final product, such as by placing them in the center layer of a three-layered sheet.

In addition to containing wet resilient fibers, the paper web can also contain a wet strength agent to improve wet resiliency. In fact, the combination of non-compressive drying to mold a three-dimensional paper web, coupled with wet strength additives and applying wet resilient fibers produces webs that maintain an unusually high bulk when wet, even after being compressed. A dry, calendered stack of such webs, such as a stack of five or more plies, particularly ten or more plies, can expand substantially in thickness upon wetting.

"Wet strength agents" are materials used to immobilize the bonds between the fibers in the wet state. Any material that when added to a paper web or sheet results in providing the sheet with a wet geometric tensile strength:dry geometric tensile strength ratio in excess of 0.1 will, for purposes of this invention, be termed a wet strength agent. Typically these materials are termed either as permanent wet strength agents or as "temporary" wet strength agents. For the purposes of differentiating permanent from temporary wet strength, permanent will be defined as those resins which, when incorporated into paper or tissue products, will provide a product that retains more than 50% of its original wet strength after exposure to water for a period of at least five minutes. Temporary wet strength agents are those which show less than 50% of their original wet strength after being saturated with water for five minutes. Both classes of material find application in the present invention, though permanent wet strength agents are believed to offer advantages when a pad of the present invention is to be reused or used in a wet state for a prolonged period of time.

The amount of wet strength agent added to the pulp fibers can be at least about 0.1 dry weight percent, more specifically about 0.2 dry weight percent or greater, and still more specifically from about 0.1 to about 3 dry weight percent based on the dry weight of the fibers.

Permanent wet strength agents will provide a more or less long-term wet resilience to the structure. In contrast, the temporary wet strength agents would provide structures that had low density and high resilience, but would not provide a structure that had long-term resistance to exposure to water or body fluids. The mechanism by which the wet strength is generated has little influence on the products of this invention as long as the essential property of generating water-resistant bonding at the fiber/fiber bond points is obtained. Suitable permanent wet strength agents are typically water soluble, cationic oligomeric or polymeric resins that are capable of either crosslinking with themselves (homocrosslinking) or with the cellulose or other constituent of the wood fiber. The most widely-used materials for this purpose are the class of polymer known as polyamide-polyamine-epichlorohydrin (PAE) type resins. These materials have been described in patents issued to Keim (U.S. Pat. Nos. 3,700,623 and 3,772,076) and are sold by Hercules, Inc., Wilmington, Del., as KYMENE 557H. Related materials are marketed by Henkel Chemical Co., Charlotte, N.C. and Georgia-Pacific Resins, Inc., Atlanta, Ga.

Polyamide-epichlorohydrin resins are also useful as bonding resins in this invention. Materials developed by Monsanto and marketed under the SANTO RES label are base-activated polyamide-epichlorohydrin resins that can be used in the present invention. These materials are described in patents issued to Petrovich (U.S. Pat. No. 3,885,158; U.S. Pat. No. 3,899,388; U.S. Pat. No. 4,129,528 and U.S. Pat. No. 4,147,586) and van Eenam (U.S. Pat. No. 4,222,921). Although they are not as commonly used in consumer products, polyethylenimine resins are also suitable for immobilizing the bond points in the products of this invention. Another class of permanent-type wet strength agents are exemplified by the aminoplast resins obtained by reaction of formaldehyde with melamine or urea.

Suitable temporary wet strength resins include, but are not limited to, those resins that have been developed by American Cyanamid and are marketed under the name PAREZ 631 NC (now available from Cytec Industries, West Paterson, N.J.). This and similar resins are described in U.S. Pat. Nos. 3,556,932 to Coscia et al. and 3,556,933 to Williams et al. Other temporary wet strength agents that should find application in this invention include modified starches such as those available from National Starch and marketed as CO-BOND 1000. It is believed that these and related starches are disclosed in U.S. Pat. No. 4,675,394 to Solarek et al. Derivatized dialdehyde starches, such as described in Japanese Kokai Tokkyo Koho JP 03,185,197, may also provide temporary wet strength. It is also expected that other temporary wet strength materials such as those described in U.S. Pat. No. 4,981,557; U.S. Pat. No. 5,008,344 and U.S. Pat. No. 5,085,736 to Bjorkquist would be of use in this invention. With respect to the classes and the types of wet strength resins listed, it should be understood that this listing is simply to provide examples and that this is neither meant to exclude other types of wet strength resins, nor is it meant to limit the scope of this invention.

Although wet strength agents as described above find particular advantage for use in connection with this invention, other types of bonding agents can also be used to provide the necessary wet resiliency. They can be applied at the wet end of the basesheet manufacturing process or applied by spraying or printing, etc. after the basesheet is formed or after it is dried.

Once the paper web is formed, the paper web can be used to form the sponge-like pad 20 as shown in FIG. 1. In one embodiment, however, if desired, the plies of the paper web can be apertured or perforated. The plies can be apertured individually or apertured together such that the holes are in alignment. Further, only selected plies of the pad can be apertured if desired.

If the plies are apertured, the holes formed into the plies can occupy from about 2% to about 60% of the surface area of the ply, particularly from about 2% to about 40% of the surface area, and more particularly from about 5% to about 25% of the surface area of the ply.

As described above in relation to FIGS. 1 and 2, the plies are attached together using a binder. The binder can be an adhesive, a film, or binder fibers. In one embodiment, the plies are connected together at selected areas to allow for the pad to have a substantial amount of void volume. For instance, the binder material can be added in a manner that does not substantially decrease the absorbent capacity of the pad and that permits good fluid communication between neighboring layers of the pad. Interply bonding can occur in a manner that does not require substantial compression of the tissue layers as the bonds are set, such that a high bulk structure is maintained.

Any known class of binder material can be considered, such as thermoplastic solid materials (particles or fibers), hotmelts, slurries, emulsions, and liquids (e.g., resins or solutions) that can be cured or set by application of heat or other energy sources to provide dry, water-resistant bonds between fibers. The binder material can comprise about 50% or less of the dry mass of the cellulosic web, such as from about 1% to 45%, or from 1% to 25%, or from 6% to 15%.

For solid binder materials, any known thermoplastic material can be used as a binder, provided that the material can be fused at a temperature that does not destroy or render unsuitable the fibrous mat itself. A thermoplastic binder upon activation by heat becomes soft but reverts to its normal frozen state upon cooling. Representative of such thermoplastic binder materials are polypropylenes, polyethylenes, polycarbonates, polyvinyl chloride, polyesters, polystyrenes, acrylics and the like. The binder material may be hydrophobic or hydrophilic. Hydrophilic fibers can be inherently hydrophilic or can be a synthetic hydrophobic fiber that has been treated with a hydrophilic coating. Examples of hydrophilic binder fibers are given in U.S. Pat. No. 5,849,000, issued Dec. 15, 1998 to Anjur et al., herein incorporated by reference.

The binder material can be unicomponent fibers, bicomponent, or multicomponent polymer fibers such as sheath/core fibers or side-by-side bicomponent fiber, having a first component with a lower melting point than the second component, such that upon heating to about the melting point of the first component, the first component can fuse and bond to nearby cellulosic fibers while the second component can maintain the integrity of the binder fiber. Examples include DANAKLON® bicomponent fibers of Hercules, Inc. (Wilmington, Del.); or PET (poly(ethylene terphthalate)) core fibers an activated co-polyethylene sheath, such as CELBOND® fibers produced by KoSA Inc. (formerly Trevira Inc. and formerly Hoechst-Celanese), Salisbury, N.C., under the designation T-255 and T-256. Other useful binder fibers include the copolyester fibers described by W. Haile et al. in the article, "Copolyester Polymer for Binder Fibers," Nonwovens World, April-May 1999, pp. 120-124, or materials produced by ES FiberVisions Inc. (Wilmington, Del.). In addition to sheath/core fibers, components of a binder fiber having a plurality of polymers may be arranged in a side by side arrangement, a pie arrangement or an "islands-in-the-sea" arrangement, or in a blend. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios. The fibers may also have shapes such as those described in U.S. Pat. Nos. 5,277,976 to Hogle et al., and 5,069,970 and 5,057,368 to Largman et al., hereby incorporated by reference in their entirety, which describe fibers with unconventional shapes.

Unicomponent fibers can include, by way of example, polyethylene microfibers marketed as PULPEX™ fibers by Hercules, Inc. (Wilmington, Del.) or Eastman's Kodel®410 binder fiber. This fiber requires a minimum temperature of about 132° C. for good bonding. CoPET B from Eastman Chemical Company is another commercially available binder material with an activation temperature of about 110° C. or higher. (This material can also be used as a sheath. For example, a useful bicomponent fiber is a coextruded sheath/core bicomponent with 35% COPET B and a 65% PET core.)

The present inventors have found that when using fibers to bind the plies together, various advantages are realized. For instance, the fibers can be deposited between the layers of the paper web, followed by thermal bonding to provide strength and stability to the formed pad without having to compress the layers together. Successful results have been obtained with only adding 2% by weight or less add-on of binder fibers sprinkled on one surface of each ply, followed by heat treatment to activate the binder fibers. The use of binder fibers also allows the plies to be attached together without a substantial reduction in liquid transport between the plies. Because of their initially high bulk and relatively long length, binder fibers are also useful in joining two highly textured surfaces together when the contact point between the two surfaces occupy a relatively small area.

The binder material can also be a microwave-sensitize material having a high dielectric loss constant (e.g., from about 1 to 1,000 measured at a frequency of 1 kHz) such that the binder material is heated more than the cellulosic fibers when microwave energy is applied. (Cellulose can have a loss factor on the order of about 0.06 at 1 kHz.) Exemplary materials include polyamide or polyvinyl methyl based hot melt adhesives and other thermoplastics known in the art. Polyether block amides, polyvinylchloride (PVC) and related compounds also have high loss factors. The material can have a loss factor much greater than that of cellulose.

Binder materials can also be applied as liquid resins, slurries, colloidal suspensions, or solutions that become rigid or crosslinked upon application of energy (e.g., microwave energy, heat, ultraviolet radiation, electron beam radiation, and the like). For example, Stypol XP44-AB12-51B of Freeman Chemical Corp., a diluted version of the Freeman 44-7010 binder, is a microwave-sensitive binder that was used by Buckley et al. in U.S. Pat. No. 6,001,300, issued Dec. 14, 1999, previously incorporated by reference. Buckley et al. also disclose the following UV-sensitive binders available from Freeman Chemical: 80497 (slow system), 747-10 (medium system) and 19-4837 (fast system).

Various types of thermosetting binders are known to the art such as polyvinyl acetate, vinyl acetate, ethylene-vinyl chloride, styrene butadiene, polyvinyl alcohol, polyethers, and the like, as well as elastomeric latex emulsions. Representative thermosetting binder materials which are adapted for application in the form of a liquid dispersion include copolymers of ethylene and acrylic acid, vinyl acetate-ethylene copolymers, acrylonitrile-butadiene copolymers, vinylchloride polymers, vinylidene chloride polymers, curable acrylic latex compositions, "Airflex" available from Air Products & Chemicals, P.O. Box 97, Calvert City, Ky. 42029, and the like.

Latex that does not become crosslinked can be useful in producing an absorbent article that is also flushable after use. For example, commercial latex sources can be used, wherein a crosslinker is present, without causing significant crosslinking if the temperature of curing is kept below a designated temperature (e.g., below 130° C. for many lattices), or if the pH is kept at a level incompatible with latex crosslinker (e.g., a pH of 8 or above, more specifically 8.5 to 10.8). Alternatively, a crosslinking inhibitor could be added to preclude crosslinking, even when heated. Sodium bicarbonate, for example, can be a useful crosslinking inhibitor. Also alternatively, latex can be prepared with substantially no crosslinker present (typically NMA), such that a water-dispersible film can form upon drying which can provide strength in the dry state and a reduced degree of strength when moistened, with the possibility of rapid break up when flushed. For some purposes, however, it may useful if the article is substantially latex free, or, more specifically, natural latex-free, and such latex free articles can be produced within the scope of the present invention.

Water-soluble, non-colloidal, cationic, thermosetting binders suitable for use with cellulosic fibers are disclosed in U.S. Pat. No. 4,617,124, issued Oct. 14, 1986 to Pall et al., herein incorporated by reference, where epoxide-based versions are said to be preferred, including both polyamido/polyaminoepichlorohydrin resins and polyamine-epichlorohydrin resins, such as Kymene®557 and the Polycup® series of resins manufactured by Hercules Incorporated (Wilmington, Del.). Related materials can be prepared by reacting epichlorohydrin with condensation products of polyalkylene polyamides and ethylene dichloride. Compositions of this type are disclosed in U.S. Pat. No. 3,855,158 and are exemplified by Santo-res® 31, a product of Monsanto Inc. Another form of this particularly type of binder resin is prepared by the reaction of epichlorohydrin with polydiallyl methyl amine to produce an epoxide functional quaternary ammonium resin. Compositions of this kind are disclosed in U.S. Pat. No. 3,700,623 and are exemplified by Resin R4308, a product of Hercules Incorporated. The disclosures of U.S. Pat. Nos. 3,855,158 and 3,700,623 are incorporated herein by reference.

Water degradable binder fibers can be used such as those used in the coform products of U.S. Pat. No. 5,948,710, issued Sep. 7, 1999 to Pomplun et al., or those disclosed by Jackson et al. in U.S. Pat. No. 5,916,678, issued Jun. 29, 1999, both of which are herein incorporated by reference.

Polycarboxylic acids can also be used as thermally curable binder materials. For example, commonly owned U.S. patent application Ser. No. 09/426,300, "Patterned Application of Polymeric Reactive Compounds to Fibrous Webs," filed Oct. 25, 1999 by Sun and Lindsay, herein incorporated by reference in its entirety, discloses polymeric anionic reactive compounds which can be applied to cellulosic webs to cause crosslinking between the fibers for good strength and bonding. The polymeric reactive compound can be a polymer such as a copolymer, terpolymer, block copolymer, homopolymer, or the like, comprising a monomer with carboxylic acid groups on adjacent atoms (particularly adjacent carbon atoms) that can form cyclic anhydrides in the form of a 5-membered ring, with maleic acid or its derivatives representing specific embodiments of such a monomer. Copolymers of maleic acid or maleic anhydride are thus useful polymeric reactive compounds. Polyacrylic acid can be formed to be useful for the present invention, particularly if a significant portion of the polymer comprises monomer that are joined head to head rather than head to tail, to ensure that carboxylic acid groups are present on adjacent carbons. Copolymers of maleic acid or anhydride with acrylic acid or its derivatives are also useful polymeric reactive compounds. A useful commercial compound comprising polycarboxylic acids suitable for bonding fibers in an airlaid web is BELCLENE® DP80 from FMC Corporation, which is a terpolymer of maleic acid, vinyl acetate, and ethyl acetate.

Useful catalysts for curing with polycarboxylic acids include alkali metal salts of phosphorous containing acids such as alkali metal hypophosphites, alkali metal phosphites, alkali metal polyphosphonates, alkali metal phosphates, and alkali metal sulfonates. Useful metal polyphosphonates can include sodium hexametaphosphate and alkali metal hypophosphites such as sodium hypophosphite. When a catalyst is used to promote bond formation, the catalyst is typically present in an amount in the range from about 5 to about 20 weight percent of the polycarboxylic acid. More specifically, the catalyst can be present in an amount of about 10 percent by weight of the polycarboxylic acid. A variety of suitable catalysts are described in U.S. Pat. No. 4,820,307, issued Apr. 11, 1989 to Welch et al., herein incorporated by reference. Other useful catalysts include sodium phosphate, sodium sulfate, imidazole, carbodiimide, triethyl amine, and salts of unsaturated dicarboxylic acids.

Oven-curing of cellulose fabrics with polycarboxylic crosslinkers is disclosed by Kitchens et al. in U.S. Pat. No. 5,042,986, issued Aug. 27, 1991, herein incorporated by reference. Curing is performed at about 150-240 degrees Celsius for 5 seconds to 30 minutes, with the lowest time reported as actually used being 15 seconds. Still faster methods (flash curing) are disclosed in commonly owned, copending U.S. application Ser. No. 09/425,810, "Flash Curing of Fibrous Webs Treated with Polymeric Reactive Compounds," filed Oct. 25, 1999 by Sun and Lindsay, herein incorporated by reference.

Binders applied in liquid or solution form to the fibrous web can include any of the binders described in U.S. Pat. No. 5,609,727, issued Mar. 11, 1997 to Hansen et al., herein incorporated by reference. The binder material can be selected for cost and performance attributes. The binder may optionally contain various fillers, pigments, dyes, etc. if desired.

In addition to adhesives, fibers or hot melt compositions, the binder material can be a film, such as an apertured film, placed between a pair of neighboring, substantially coextensive paper webs. The binder material can also be provided as a powder or in liquid or melt form, applied by a nozzle or coating blade or other known means. The binder material can comprise natural materials such as starch, gum Arabic, and the like or adhesives containing natural fibers, exemplified by U.S. Pat. No. 5,958,558, incorporated herein by reference. Thermoplastic adhesives can also be used such as those disclosed in U.S. Pat. No. 5,958,178 also incorporated herein by reference.

Binder materials can also be biodegradable and can include polylactic acid and biodegradable polyesters.

Heating of the binder material is needed in some embodiments to achieve bonding between the plies in a stack. The stack can be heated conductively, such as by contacting the stack with heated plates to fuse or cure binder material. The stack can also be heated convectively, such as by passing a flow of heated air or steam through the plies of the stack. Radiative heating can also be done in any known manner, such as by applying microwave or other radiofrequency energy, induction heating of electrically conductive elements in the web, applying infrared radiation, applying ultrasonic energy, and the like. One form of convective heat transfer of value in the present invention is the hot air knife, or HAK, as described in U.S. Pat. No. 5,962,112, issued Oct. 5, 1999 to Haynes et al., herein incorporated by reference.

Conductive heat sources can be heated by any known method, such as by externally applied infrared radiation or gas flame, induction heating, or by internal heating from a flow of steam, hot oil or other heat transfer fluid, or by the use of combustion inside a roll (e.g., an internal natural gas flame)

The use of radiofrequency energy, microwaves or other electromagnetic means of applying energy to a web can allow more uniform treatment of the web or of any binder material in the web. As used herein, "radiofrequency" (RF) energy comprises electromagnetic radiation in the spectral range of 300 Hz to 300 GHz. "Microwave radiation" is a subset of RF radiation spanning the spectral range from 30 MHz to 300 GHz. Typical frequencies for microwave energy are 915 MHz and 2450 MHz (2.45 GHz), the ISM bands allowed by the Federal Communication Commission (FCC). General principles for microwave heating are given by R. C. Metaxas and R. J. Meredith in *Industrial Microwave Heating*, Peter Peregrinus, LTD, London, 1983. A useful tool in the design of microwave heating systems is the HFSS™ software provided by Ansoft Corp. (Pittsburgh, Pa.).

When radiofrequency energy is applied, the web can incorporate binder materials such as thermoplastic binder fibers or curable resins that are relatively sensitive to radiofrequency radiation (compared to pure cellulose itself) by virtue of a high dipole moment. In one embodiment, microwave energy is applied to the moving web as it passes through an opening in a microwave resonance chamber, where microwave energy is focused into the web.

In one embodiment, applying sufficient energy to the absorbent web comprises application of microwaves to cause components in the web to heat sufficiently to fuse or melt thermoplastic binder materials without substantial fusing of any adjacent nonwoven layers such as a spunbond web. For example, an airlaid web can comprise fibers and/or particles of dipolar polymers such as polyurethanes, isocyanates, polyethylene oxide, polyester, and their derivatives, or mixtures or copolymers formed therefrom. Application of microwave radiation causes the dipolar polymers to become heated enough to either fuse or to cause other less dipolar thermoplastic materials to fuse. For example, a sheath-core bicomponent fiber with a polyester core and a polyolefin sheath can be subjected to microwave radiation to cause the core to heat sufficiently to cause melting of the sheath without melting or degradation of the core. Alternatively, the sheath can be more microwave susceptible than the core. An exemplary application of microwave energy is found in the commonly owned PCT publication WO 99/22686, "Composite Material with Elasticized Portions and a Method of Making the Same," by R. G. Brandon, F. M. Chen, and R. E. Vogt, U.S. Pat. No. 5,916,203, issued Jun. 29, 1999. Further details of providing microwave chambers for applying energy to a moving web are disclosed in U.S. Pat. No. 5,536,921, issued Jul. 16, 1996 to Hedrick et al.; U.S. Pat. No. 6,020,580; and U.S. Pat. No. 4,234,775, issued Nov. 18, 1980 to Wolfberg et al.; all of which are herein incorporated by reference.

U.S. Pat. No. 5,958,275, issued Sep. 28, 1999 to Joines et al., herein incorporated by reference, provides several useful embodiments for application of microwave energy to a moving planar material such as a web. The web passes through a slot in a microwave chamber that has adjustably variable path lengths to allow peaks and valleys of the electromagnetic field in one exposure segment to compensate for peaks and valleys in another exposure segment. For example, the microwave chamber may have a serpentine shape that makes several passes over the web to ensure uniform application of microwave energy. Specialized choke flanges prevent the escape of electromagnetic energy. One or more rollers between exposure segments in the microwave chamber may be enclosed by an outer surface to prevent the escape of electromagnetic energy.

In an embodiment related to the equipment disclosed in commonly owned U.S. application Ser. No. 09/603,714 by R. E. Vogt, filed Jun. 27, 2000, herein incorporated by reference, microwave energy is directed by a waveguide into a resonance chamber adapted to focus energy into a plane or along a line through which the moving web passes. A cylindrical chamber can be suitable, for example, wherein the web travels along a diameter of the chamber, entering and leaving through slots along opposing sides of the cylinder. Quarter-wavelength chokes extend outward from the slots to prevent excess leakage of microwave radiation through the slots. When tuned for microwave energy to fill the chamber in the $TM_{010}$ mode, the energy is focussed along the axis of the cylinder and thus into the web for efficient delivery of energy. (TM modes are generally expected to be useful for microwave heating of a web in the present invention. TEM modes can be used but are more likely to permit leakage of microwaves from the chamber.) The web may be carried on a belt of material such as Teflon™ that is relatively unsusceptible to microwave energy, or the web can pass through the chamber without being on a carrier belt.

General principles for use of cylindrical resonance chambers for microwave heating and the coupling of a waveguide to an aperture in the cylinder are given by R. C. Metaxas and R. J. Meredith in *Industrial Microwave Heating*, Peter Peregrinus, LTD, London, 1983, pp. 183-195. In general, a rectangular waveguide is choked down through an aperture in the center of the cylinder (e.g., on the top or bottom of the central portion of the cylinder when a web runs through the middle of the cylinder along the horizontal diameter) to provide efficient transfer and distribution of microwave energy into the cylinder.

U.S. Pat. No. 6,020,580, issued Feb. 1, 2000 to Lewis et al., herein incorporated by reference, discloses a suitable microwave applicator with an elongated chamber such as a cylindrical shape which can be used or adapted in accordance with Vogt (U.S. application Ser. No. 09/603,714) for use in the present invention. A waveguide, connected to the elongated chamber, couples microwave power into the elongated chamber. The cross-sectional area of the elongated chamber can be mechanically adjusted to control and maintain the microwave field uniformity and resonant mode, suitably a length independent mode $TM_{010}$, during the processing of the material. The applicator thus provides microwave energy having a substantially uniform field distribution over a large area for processing a web.

In addition to heating and activating thermoplastic binder materials, electromagnetic radiation in the form of microwaves or ultraviolet radiation, for example, can also be used to cure resins that are in liquid form. For example, an airlaid web or fluff web can be impregnated or sprayed with a liquid binder system, followed by application of light pressure to mold the web into a three-dimensional shape as radiation is applied to cure the liquid binder. Heat can also be applied to cure some binder systems, wherein the heat is applied by throughdrying or other convective means with hot gas passing into the web, infrared radiation, conduction, and the like. Examples of microwave and UV curing of resins in a fibrous preform is found in U.S. Pat. No. 5,169,571, issued Dec. 8, 1992 to D. T. Buckley, and in U.S. Pat. No. 5,338,169, issued Aug. 16, 1994, also to Buckley, both of which are herein incorporated by reference.

A method for simultaneously applying microwave radiation and applying moderate pressure to a web can be achieved by using a microwave-transparent solid material, or microwave window, as one of the surfaces pressing against a bulky web. Suitable microwave windows and cooling systems for the windows are disclosed in U.S. Pat. No. 5,228,947, "Microwave Curing System," issued Jul. 20, 1993 to M. T. Churchland, herein incorporated by reference in its entirety.

While the above examples typically are directed toward a web passing through stationary microwave equipment, the microwave energy or other energy sources for heating the web can be mounted to a moving structure (or energy from a stationary source can be guided into and distributed from a rotating device), such as a rotating wheel, or an moving belt or track, to move with the web for a predetermined length or time.

In addition to the paper layers and the binder, the sponge-like pad of the present invention can also contain additional materials and functional layers or components. For example, a portion of the pad can provide a soap, detergent, or other cleaning agent when desired. Other additives that can be added to the sponge-like pad include buffering agents, antimicrobials, skin wellness agents such as lotions or hydrophobic skin barriers, odor control agents, surfactants and the like. The additives can be impregnated into the pad or can be contained in a liquid breakable pouch. Alternatively, the additives can be microencapsulated and incorporated into the pad. Application of the additives can be by any of the following methods:

- Direct addition to a fibrous slurry prior to formation of the tissue web.
- A spray applied to a web. For example, spray nozzles may be mounted over a moving tissue web to apply a desired dose of a solution to a web that can be moist or substantially dry.
- Printing onto a web, such as by offset printing, gravure printing, flexographic printing, ink jet printing, digital printing of any kind, and the like.
- Coating onto one or both surfaces of a web, such as blade coating, air knife coating, short dwell coating, cast coating, and the like.
- Extrusion from a die head of an agent in the form of a solution, a dispersion or emulsion, or a viscous mixture such as one comprising a wax, softener, debonder, oil, polysiloxane compound or other silicone agent, an emollient, a lotion, an ink, or other additive, as disclosed, for example, in WO 2001/12414, published Feb. 22, 2001, the U.S. equivalent of which is herein incorporated by reference.
- Application to individualized fibers. For example, comminuted or flash dried fibers may be entrained in an air stream combined with an aerosol or spray of the compound to treat individual fibers prior to incorporation into a web or other fibrous product.
- Impregnation of a wet or dry web with a solution or slurry, wherein the compound penetrates a significant distance into the thickness of the web, such as more than 20% of the thickness of the web, more specifically at least about 30% and most specifically at least about 70% of the thickness of the web, including completely penetrating the web throughout the full extent of its thickness.
- Foam application of an additive to a fibrous web (e.g., foam finishing), either for topical application or for impregnation of the additive into the web under the influence of a pressure differential (e.g., vacuum-assisted impregnation of the foam). Principles of foam application of additives such as binder agents are described in the following publications: F. Clifford, "Foam Finishing Technology: The Controlled Application of Chemicals to a Moving Substrate," *Textile Chemist and Colorist*, Vol. 10, No. 12, 1978, pages 37-40; C. W. Aurich, "Uniqueness in Foam Application," *Proc.* 1992 *Tappi Nonwovens Conference*, Tappi Press, Atlanta, Ga., 1992, pp. 15-19; W. Hartmann, "Application Techniques for Foam Dyeing & Finishing", *Canadian Textile Journal*, April 1980, p. 55; U.S. Pat. No. 4,297,860, "Device for Applying Foam to Textiles," issued Nov. 3, 1981 to Pacifici et al., herein incorporated by reference; and U.S. Pat. No. 4,773,110, "Foam Finishing Apparatus and Method," issued Sep. 27, 1988 to G. J. Hopkins, herein incorporated by reference.
- Padding of a chemical agent in solution into an existing fibrous web.
- Roller fluid feeding of the additive for application to the web.
- Application of the agent by spray or other means to a moving belt or fabric which in turn contacts the tissue web to apply the chemical to the web, such as is disclosed in WO 01/49937 by S. Eichhorn, "A Method of Applying Treatment Chemicals to a Fiber-Based Planar Product Via a Revolving Belt and Planar Products Made Using Said Method," published Jun. 12, 2001.

The application level of the additive can be from about 0.1 weight % to about 10 weight % solids relative to the dry mass of the web, the application level being relative to the dry fiber mass of the treated web or fibers. More specifically, the application level can be from about 0.1% to about 4%, or from about 0.2% to about 2%. Higher and lower application levels are also within the scope of the present invention. In some embodiments, for example, application levels of from 5% to 50% or higher can be considered.

Special chemical distributions may occur in webs that are pattern densified, such as the webs disclosed in any of the following U.S. Pat. Nos. 4,514,345, issued Apr. 30, 1985 to Johnson et al.; 4,528,239, issued Jul. 9, 1985 to Trokhan; 5,098,522, issued Mar. 24, 1992; 5,260,171, issued Nov. 9, 1993 to Smurkoski et al.; 5,275,700, issued Jan. 4, 1994 to Trokhan; 5,328,565, issued Jul. 12, 1994 to Rasch et al.; 5,334,289, issued Aug. 2, 1994 to Trokhan et al.; 5,431,786, issued Jul. 11, 1995 to Rasch et al.; 5,496,624, issued Mar. 5, 1996 to Stelljes, Jr. et al.; 5,500,277, issued Mar. 19, 1996 to Trokhan et al.; 5,514,523, issued May 7, 1996 to Trokhan et al.; 5,554,467, issued Sep. 10, 1996, to Trokhan et al.; 5,566,724, issued Oct. 22, 1996 to Trokhan et al.; 5,624,790, issued Apr. 29, 1997 to Trokhan et al.; and 5,628,876, issued May 13, 1997 to Ayers et al., the disclosures of which are incorporated herein by reference to the extent that they are non-contradictory herewith.

Printing, coating, spraying, or otherwise transferring a chemical agent or compound on one or more sides of the pad, of an article incorporating the pad, or of any layer or material in the pad or article can be done uniformly or heterogeneously, as in a pattern, using any known agent or compound (e.g., a silicone agent, a quaternary ammonium compound, an emollient, a skin-wellness agent such as aloe vera extract, an antimicrobial agent such as citric acid, an odor-control agent, a pH control agent, a sizing agent; a polysaccharide derivative, a wet strength agent, a dye, a fragrance, and the like). Any known method can be used, including the methods of U.S. Pat. No. 5,871,763, issued on Feb. 16, 1999 to Luu et al.; U.S. Pat. No. 5,716,692, issued on Feb. 10, 1998 to Warner et al.; U.S. Pat. No. 5,573,637, issued on Nov. 12, 1996 to Ampulski et al.; U.S. Pat. No. 5,607,980, issued on Mar. 4, 1997 to McAtee et al.; U.S. Pat. No. 5,614,293, issued on Mar. 25, 1997 to Krzysik et al.; U.S. Pat. No. 5,643,588, issued on Jul. 1, 1997 to Roe et al.; U.S. Pat. No. 5,650,218, issued on Jul. 22, 1997 to Krzysik et al.; U.S. Pat. No. 5,990,377, issued on Nov. 23, 1999 to Chen et al.; and, U.S. Pat. No. 5,227,242, issued on Jul. 13, 1993 to Walter et al., each of which is herein incorporated by reference to the extent they are not contradictory herewith.

It should be recognized that many of the methods listed above for applying additives to a tissue web can also be used to apply adhesives or binding material to a tissue web, followed by contacting the treated layer with another tissue layer for interply bonding. For example, a hotmelt adhesive or a latex binder can be coated or printed in a pattern or selectively on elevated portions of web. Printing can be done by offset printing, gravure printing, flexographic printing, ink jet printing, digital printing of any kind, and the like, with suitable control over temperatures and other characteristics of the printing devices to be compatible with the binder material. When a hotmelt adhesive is applied to the surface of a first web, a second web can be pressed against the hotmelt-treated side of the first web while the hotmelt is still melted such that interply bonds are essentially formed upon contact, or the second web can be placed in contact with the first web after the hotmelt has cooled, such that subsequent thermal treatment is needed to melt the adhesive again and promote interply bonding. In some embodiments, printed hotmelt maybe applied to one or more layers of tissue, while binder fibers, latex, or other adhesive materials are applied to another one or more layers of tissue, such that at least two kinds of binder material are present in the stack of tissues for interply bonding. Printed, sprayed, or coated hotmelt adhesives or other adhesives can be used not only for interply bonding, but also for bonding a cover material to the stack or for forming a seam to enclose the cover material.

The multiple layers of the pad need not be identical, but can vary in terms of basis weight, wet strength, fibrous composition, chemical additives, texture, method of manufacture, wet resiliency, abrasiveness, and the like. Some layers may be primarily composed of natural fibers while other layers may be primarily synthetic (e.g., nonwoven webs such as spunbond or meltblown webs, or other synthetic materials). A pair of adjacent layers could comprise any of the following: a creped and uncreped web; a calendered and uncalendered web; a web comprising hydrophobic matter or sizing agents and a more hydrophobic web; webs of two differing basis weights; webs of two differing embossment patterns; an embossed and unembossed web; a web with high wet strength and a web with low wet strength; a web having syncline marks and a web free of syncline marks; a web with antimicrobial additives and a web free of such additives; a web with asymmetrical domes and one free of domes; a through-dried web and a web dried without use of a through-dryer; webs of two different colors; an apertured web and an unapertured web; and the like.

The pad can further comprise superabsorbent particles, fibers, or films in one or more layers in the pad, including superabsorbent material encased in a central layer or portion of the pad to absorb fluid without substantially decreasing the permeability of the outer layers of the pad. An exemplary class of superabsorbent material are the superabsorbent particle laminates of Gelok International Corporation (Dunbridge, Ohio), which are fibrous webs comprising cross-linked polyacrylate polymers.

The pad can also be provided with or sold with a gripper device to keep hands dry while the pad is in used, such as the plastic Brillo Gripper™ device sold with certain Brillo™ steel wool pads by Church and Dwight Corp. (Princeton, N.J.). A gripper device can pinch or clip one surface or portion of the pad to allow scrubbing without the need for a human hand to touch the pad during scrubbing. Other similar devices and pad holders can be used.

Example No. 1

A sponge substitute according to the present invention was made by bonding plies of uncreped through-air dried tissue together. The tissue was made substantially according to Example 4 of commonly owned copending Canadian published application having Application No. 2,241,820, which claims priority to copending U.S. patent application Ser. No. 08/912,906, "Wet Resilient Webs and Disposable Articles Made Therewith," filed Aug. 15, 1997 by Chen et al. The tissue so made had a basis weight of 30 gsm and comprised 100% Temcel Tembec 525/80 spruce BCTMP pulp, with Kymene 557-LX wet strength agent of Hercules Chemical (Wilmington, Del.) added to the fibrous slurry prior to web formation, at a dosage of 26 kg Kymene per ton of dry fibers (kg/ton). The through-drying fabric used to mold the three-dimensional sheet was a Voith Fabrics (formerly Lindsay Wire, Appleton, Wis.) T-116-3 TAD fabric. The transfer fabric (used to transfer the embryonic web from the forming fabric to the TAD fabric) was a Voith Fabrics T-216-3 fabric. A 27% rush transfer level was used when the web was transferred to the TAD fabric to impart machine direction stretch and to improve molding to the TAD fabric.

Stacks of the tissue material were made by cutting rectangles. The rectangles were aligned in a stack, with binder fiber applied substantially uniformly across the upper surface of all layers in the stack except the topmost layer. The binder fiber was KOSA T-255 Bicomponent Fiber, 2.8 denier, cut to a fiber length of 0.25 inches. The binder fiber was applied pneumatically, wherein a predetermined quantity of binder fiber was dispersed and entrained in an air stream that passed through the tissue layer to uniformly deposit the entrained binder fibers over the exposed surface of the web.

Figure 6:
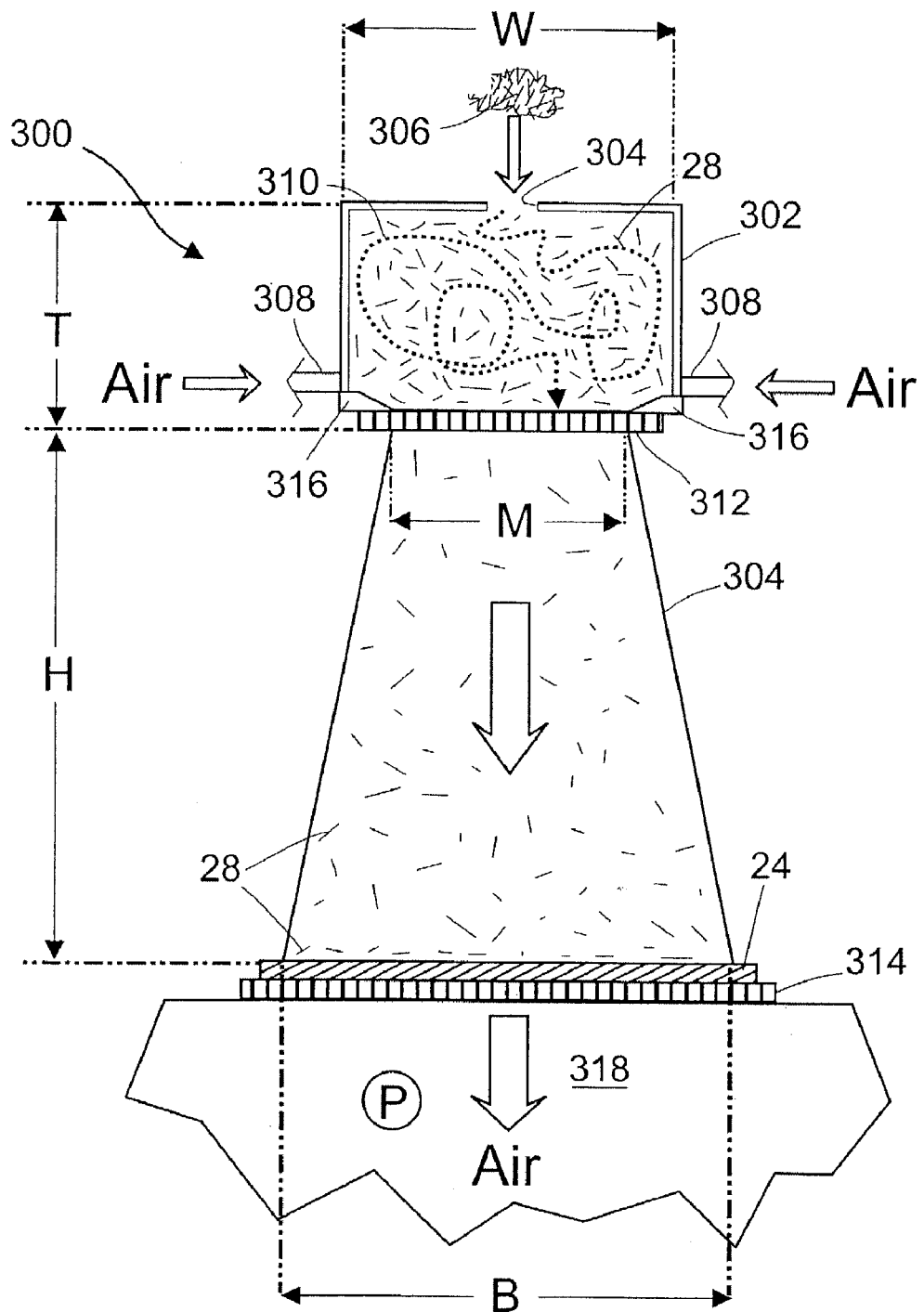
FIG. 6 depicts an airlaid handsheet former for depositing binder fibers on rectangular tissue webs.

Though many methods for pneumatically depositing a binder fiber are known and could be used, the device used for the rectangular samples made according the present invention is schematically depicted cow in FIG. 6, which shows a cross-section of an airlaid handsheet former 300 having an upper chamber 302, a lower chamber 304, a first metal screen 312 between the upper chamber 302 and the lower chamber 304, and a second metal screen 314 beneath the lower chamber 304 and disposed above a lower exhaust plenum 318 through which air exits the airlaid handsheet former 300. The upper chamber 302 has a central slot 304 in the top wall of the chamber 302 for receiving a loose mass of fibers 306. The chamber has an internal width W of 10 inches, a chamber height T of 10 inches. The depth (not shown) of the upper chamber 302 (the distance the upper chamber 302 extends in the direction normal to the page containing FIG. 6) is 15 inches. The depth of the lower chamber 304 (the distance it extends in the direction normal to the page) is 17 inches at its base (adjacent the second metal screen 314), which tapers linearly to 15 inches at its top adjacent the first metal screen 312. In the cross-sectional view shown, the internal base width B of the base of the lower section 304 is 10 inches. The lower chamber height H is 23 inches.

In the upper chamber 302, tapered projections 316 cover part of the first metal screen 312, leaving an exposed area having a screen width M of 6 inches (and still the full depth of 15 inches in the direction normal to the page). Air nozzles 308 along two opposing walls of the upper chamber 302 just above the tapered projections 316 introduce pulsating jets of air to create turbulence. The air jets are ¼-inch lines, with ten spaced apart lines running along the full depth (normal to the page) of each wall. The air jets create a pulsating turbulence which can disperse a loose mass of fibers 306. An exemplary hypothetical fiber path 310 is shown to illustrate how the individualized fibers 28 may travel in the upper chamber 302 after being separated from the loose mass of fibers 306 and before passing through the first metal screen 312 to the lower chamber 304.

The first metal screen 312 and second metal screen 314 are cut from the same material, a thin steel plate having 0.12-inch holes in a staggered grid that puts each hole at the center of a hexagonal array of holes. The 6-inch by 15-inch exposed area of the first metal screen 312 has approximately 2900 holes and an open area of about 36%.

To deposit binder fibers 28 onto a tissue web 24, the tissue web 24 is placed between the base of the lower chamber 304 and the second metal screen 314, which supports the web 24 under the influence of a pressure differential which is adjusted by controlling the pressure P in the lower exhaust plenum 318. For the examples described herein, the pressure P was set to give a pressure differential across the web 24 of about 2 inches of water to 2.4 inches of water, depending on how many plies of the tissue web 24 were present. Binder fibers 28 could be deposited on up to 6 layers of the tissue web 24 at the highest pressure differential of 2.4 inches of water, while 2 inches of water were used when only 1 tissue web 24 was being treated with binder fibers 28.

The tissue web 24 had dimensions of 11 by 18 inches (11 inches in the cross-direction, 18 inches in the machine direction), slightly larger than the exposed area of 10 inches by 17 inches onto which fibers 28 were to be deposited. The pressure P was adjusted to a vacuum pressure of 2 inches of water. With the air jets 308 on, an amount of binder fiber, calculated as a percentage of the weight of 1 sheet of the uncreped web (roughly 5, 10, or 20%), was introduced in the top chamber 302 and allowed to disperse and deposit onto the tissue web 24. Once the specified quantity of fibers 28 had been deposited on the tissue web 24, the air jets 308 were turned off, as was the vacuum in the exhaust plenum 318 to stop air flow through the airlaid handsheet former 300, and the chamber was opened to add another web 24 and to add a similar quantity of binder fiber again. This procedure was repeated until a total of 6 layers of the uncreped tissue web 24 had been covered with binder fibers 28. The pressure P at this point was 2.4 inches of water (slightly higher than the initial 2 inches of water due to decreased air flow through the assembly of webs 24 into the exhaust plenum 318. At this point the air jets 308 and vacuum in the exhaust plenum 318 were turned off and the assembly of webs 24 was removed.

A paper cutter was used for trimming the assembly to 9" CD×16" MD, then cutting into four 9"×4" sections. The sections were then stacked and a plain 9"×4" sheet of the uncreped web was placed on top, giving a total of 25 plies of the uncreped web with 24 layers of binder fiber therebetween. The assembly was then placed on a metal sheet and topped with a 437 gram metal plate for a uniformly applied load of 0.027 psi, and heated in a convection oven (Constant Temperature Oven DK-63, Baxter Scientific Products) for 20 minutes at 172° C. Following removal from the oven, the sample was allowed to cool before the metal plate was removed.

In some of the runs, compressed pads were formed by placing the 9-inch×4-inch stack of bonded webs in a Carver press Model 3977 (Carver, Inc. Menomonee Falls, Wis.) or, in a few runs, a Carver press Model 2833 (Fred S. Carver, Inc. Wabash Ind.), and pressing at a load of 20,000 pounds for 1 minute with both upper and lower platens heated to 65° C. (150° F.). Three-inch square specimens were then cut for testing. Uncompressed samples were die-cut, while compressed were cut on a paper cutter.

Samples prepared under the above-mentioned conditions were used for testing of absorbency properties, as set forth below. Additional samples with rectangular tissue sections were made using several other combinations of cure time, load during curing, number of tissue web layers, and amount of binder fibers. These samples are listed in Table 1 below.

TABLE 1

Formation of rectangular samples.

| Sample | Plies | Binder/ply | Cure time | Load (psi) |
|---|---|---|---|---|
| 1 | 24 | 5.5% | 30 | 0.060 |
| 2 | 25 | 5.5% | 15 | 0.060 |
| 3 | 25 | 5.5% | 20 | 0.027 |
| 4 | 25 | 5.5% | 20 | 0.060 |
| 5 | 28 | 5.5% | 30 | 0.060 |
| 6 | 2 | 10.9% | 15 | 0.008 |
| 7 | 3 | 10.9% | 15 | 0.008 |
| 8 | 10 | 10.9% | 20 | 0.027 |
| 9 | 11 | 10.9% | 15 | 0.000 |
| 10 | 16 | 10.9% | 15 | 0.000 |
| 11 | 21 | 10.9% | 15 | 0.000 |
| 12 | 21 | 10.9% | 25 | 0.001 |
| 13 | 25 | 10.9% | 20 | 0.027 |
| 14 | 25 | 10.9% | 25 | 0.050 |
| 15 | 25 | 21.8% | 15 | 0.060 |
| 16 | 25 | 21.8% | 20 | 0.027 |
| 17 | 40 | 21.8% | 30 | 0.050 |

Cylindrical stacks were also made substantially as specified above with regard to the rectangular samples, except that the uncreped tissue web was cut into 3-inch diameter disks which were then placed in an assembly of multiple layers provided with binder fiber between each adjacent pair of layers, and the assembly was heated to thermally bond the fibers.

Figure 7:
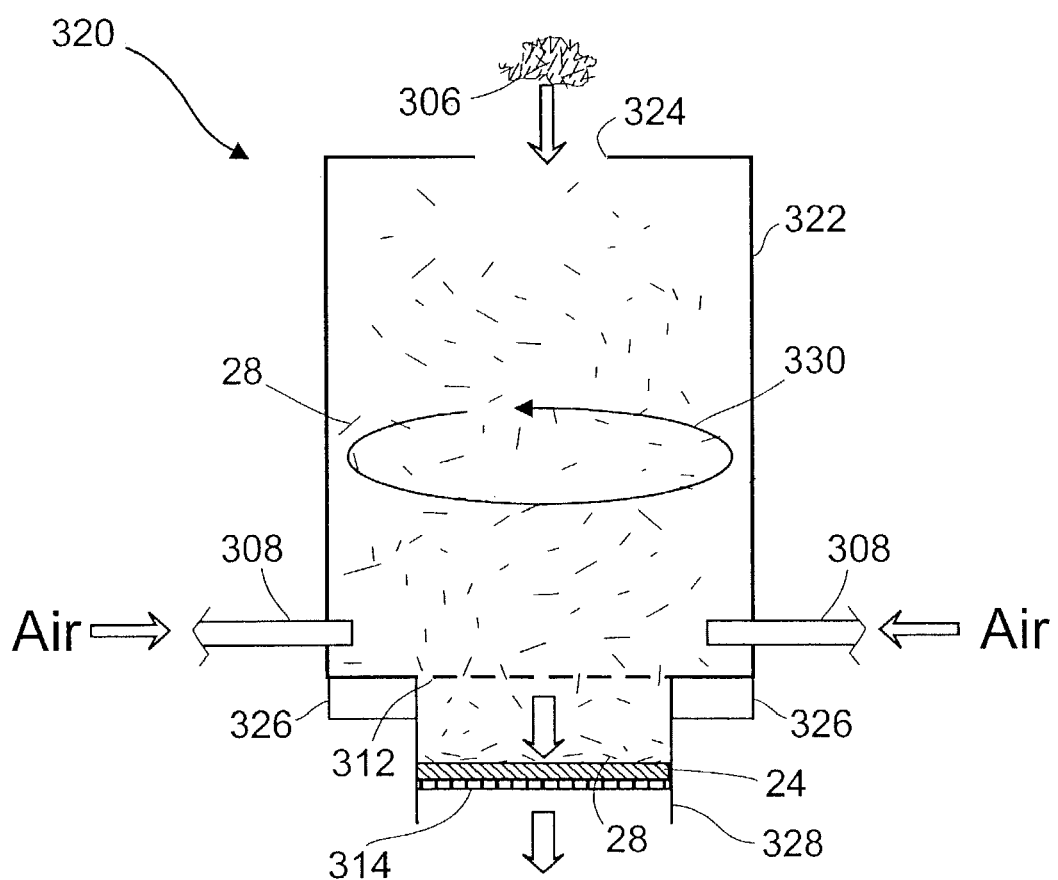
FIG. 7 depicts an airlaid handsheet former for depositing binder fibers on circular tissue webs.

The pneumatic addition of binder fiber to the cylindrical samples was achieved using a cylindrical airlaid handsheet former 320 shown in FIG. 7. Here a cylindrical chamber 322 (height of 6 inches, diameter of 5 inches) has an upper opening 324 for receiving a loose mass of fibers 306. Swirling turbulence is created by pulsating air jets 308 radially spaced apart near the bottom of the cylindrical chamber 322 such that 8 air jets 308 of ⅛-inch internal diameter supply pressurized air to the cylindrical airlaid handsheet former 320 such that turbulent air swirls in the chamber. Fibers introduced into the cylindrical chamber 322 are not lost through the aperture 324, but remain in the cylindrical chamber 322 as air passes downward toward the first metal screen 312, which actually is integral with the cylindrical chamber 322 and comprises 69⅛-diameter holes drilled in the bottom wall of the cylindrical chamber 322 and spaced apart such that 69 holes occupy a 3-inch diameter central region on the lower surface of the cylindrical chamber 322 to define a first metal screen 312.

Attached to the underside of the cylindrical chamber 322 directly below the first metal screen 312 is a removable fiber receiving device 328 that comprises a cylinder with a 3-inch internal diameter and a second metal screen 314 onto which fibers 28 could be collected were it not for the presence of the added 3-inch diameter tissue web 24 on top of the second metal screen 314. The second metal screen 314 actually comprises a lower 100 mesh wire with a 20 mesh wire disposed above it, forming a surface for holding the circular tissue web 24. The fiber receiving device 328 is held in place next to the cylindrical chamber 322 by a plastic support ring 326, from which the fiber receiving device 328 can be detached to collect the tissue web 24 after binder fibers 28 have been deposited thereon.

Differential pressure of about 2 inches of water is applied with vacuum pressure beneath the second metal screen 314 to drive air through the tissue web 24 and to promote the collection of binder fibers 28 on the web 24. One layer at a time can be treated and stacked together (up to four layers) to form a web assembly with binder fibers between each layer for thermal curing. A final layer of the web is placed on top of the assembly before it is thermally cured.

For the cylindrical samples, thermal curing was done with a hot air gun applied to the assembly of layers as they resided on a vacuum box. The heat gun was a Milwaukee Variable Temperature Heat Gun, Cat. No. 8977, Milwaukee Electric Tool Corp (Brookfield, Wis.). The vacuum box had dimensions of 11 inches by six inches, but was blocked off to correspond to the dimensions of the assembly of web layers. The assembly was placed on the exposed honeycomb grid top plate with about 70 inches of water vacuum applied. Heat was applied using a vacuum gun, moving back and forth over sample until sample was sufficiently heated but unscorched. Some trial and error was needed to ensure that the sample was sufficiently heated to fuse the binder fibers. Incompletely cured samples could were simply reheated until bonding was completed.

The binder fiber was KOSA T-255 Bicomponent Fiber, 2.8 denier, cut to a fiber length of 0.25 inches.

Details of the cylindrical samples are listed in Table 2 below.

TABLE 2

Formation of cylindrical samples.

| Sample | Plies | Binder/ply |
|---|---|---|
| 18 | 3 | 2.1% |
| 19 | 19 | 2.1% |
| 20 | 2 | 4.3% |

Samples were tested for absorbent capacity and dry caliper at a load of 0.03 psi. Results are given in Table 3.

TABLE 3

Physical properties of rectangular samples.

| Sample # | Carver Press Model | Specimen Wt., gms Dry | Specimen Wt., gms Wet | Absorption Capacity gm/gm | DRY Caliper in. @ 0.03 psi Not Comp. | DRY Caliper in. @ 0.03 psi Compressed |
|---|---|---|---|---|---|---|
| Control | NoPress | 4.47 | 103.99 | 22.3 | 0.768 | — |
| 3 | 3977 | 4.48 | 84.07 | 17.8 | 0.754 | 0.077 |
| 3 | 3977 | 4.57 | 87.02 | 18.0 | 0.762 | 0.072 |
| 8 | 3977 | 1.93 | 35.27 | 17.3 | 0.312 | 0.034 |
| 8 | 3977 | 1.95 | 35.40 | 17.2 | 0.314 | 0.034 |
| 8 | 2833 | 4.70 | 73.50 | 14.6 | 0.729 | 0.094 |
| 8 | 2833 | 4.79 | 77.44 | 15.2 | 0.739 | 0.086 |
| 13 | 3977 | 4.76 | 79.35 | 15.7 | 0.739 | 0.082 |
| 13 | 3977 | 4.73 | 79.01 | 15.7 | 0.756 | 0.080 |
| 13 | 3977 | 4.80 | 75.66 | 14.8 | 0.749 | 0.079 |
| 13 | 3977 | 4.70 | 74.36 | 14.8 | 0.760 | 0.075 |
| 13 | NoPress | 5.03 | 79.74 | 14.9 | 0.705 | — |
| 16 | 3977 | 5.25 | 77.22 | 13.7 | 0.769 | 0.099 |
| 16 | 3977 | 5.21 | 77.14 | 13.8 | 0.776 | 0.099 |

For comparison, three commercial sponge materials were tested, as reported in Table 4. Sample A is a compressed regenerated cellulose sponge (Clipper Mill™, UPC 24055 28848), Sample B is a similar product (O-Cel-O™ by 3M, UPC 53200 07224), and Sample C is a polyurethane sponge (Turn-A-Bout™, with the cover removed, Arden Co., UPC 70145 16020).

TABLE 4

Physical properties of prior commercial sponges.

| Sample # | Specimen Wt., gms Dry | Specimen Wt., gms Wet | Absorption Capacity gm/gm | Dry Caliper in. @ 0.03 psi Not Comp. | Dry Caliper in. @ 0.03 psi Compressed |
|---|---|---|---|---|---|
| A | 3.46 | 102.87 | 28.7 | — | 0.043 |
| B | 4.07 | 88.28 | 20.7 | 0.506 | — |
| C | 1.87 | 10 | 4.3 | 0.590 | — |

Wet Compressive Recovery results are given in Table 5, which also shows the Dry Caliper of pads in inches at a load of 0.03 psi before and after mechanical compression.

TABLE 5

Wet Compression Recovery in rectangular stacks of tissue.

| Sample | Dry Caliper in. @ 0.03 psi Not Comp. | Dry Caliper in. @ 0.03 psi Compr. | Initial 0.03 | Comp. #1 1.125 | Recov. #1 0.03 | Comp. #2 1.125 | Recov. #2 0.03 | % Wet Comp. Recovery |
|---|---|---|---|---|---|---|---|---|
| Control | 0.768 | — | 0.613 | 0.368 | 0.496 | 0.354 | 0.475 | 77 |
| 8 | 0.705 | — | 0.736 | 0.477 | 0.593 | 0.461 | 0.568 | 77 |
| 3 | 0.754 | 0.077 | 0.575 | 0.329 | 0.472 | 0.319 | 0.450 | 78 |
| 3 | 0.762 | 0.072 | 0.573 | 0.326 | 0.467 | 0.316 | 0.445 | 78 |
| 13 | 0.739 | 0.082 | 0.555 | 0.036 | 0.488 | 0.349 | 0.472 | 85 |
| 13 | 0.756 | 0.080 | 0.566 | 0.351 | 0.486 | 0.340 | 0.466 | 82 |
| 16 | 0.769 | 0.099 | 0.582 | 0.397 | 0.520 | 0.385 | 0.504 | 87 |
| 16 | 0.776 | 0.099 | 0.580 | 0.390 | 0.519 | 0.384 | 0.502 | 87 |

TABLE 5-continued

Wet Compression Recovery in rectangular stacks of tissue.

| | Dry Caliper in. @ 0.03 psi | | Wet Compression Recovery | | | | | |
|---|---|---|---|---|---|---|---|---|
| Sample | Not Comp. | Compr. | Initial 0.03 | Comp. #1 1.125 | Recov. #1 0.03 | Comp. #2 1.125 | Recov. #2 0.03 | % Wet Comp. Recovery |
| 8 | 0.312 | 0.034 | 0.239 | 0.125 | 0.194 | 0.123 | 0.186 | 78 |
| 8 | 0.314 | 0.034 | 0.236 | 0.124 | 0.182 | 0.121 | 0.175 | 74 |

The compressed commercial sponge, Sample A of Table 4, was also measured and yielded a % Recovery value of 0.91, slightly greater than the values obtained with the sponge substitute of the present invention made with inexpensive uncreped tissue rather than expensive regenerated cellulose. (Commercial Samples B and C, which had not been compressed, not surprisingly had even higher Wet Compressed Recovery values of 95% and 97%, respectively.)

Exemplary products were made from several of the above pads, including compressed and uncompressed samples, by wrapping the pads in cover materials and bonding the seam to provide a complete wrap. In several cases, a nonwoven wipe material was used, the same wiped to produce commercially available Sani-Tuf™ wipers, which is believed to be made substantially according to U.S. Pat. No. 4,833,003, "Uniformly Moist Abrasive Wipes," issued May 23, 1989 to Win et al., previously incorporated by reference. This material is a dual-textured meltblown having a smooth side and a side suitable for scrubbing. The basesheet, without the added solution of the commercial product, was used both as is and in an enhanced wettability form. Wettability was enhanced by soaking the meltblown sheet for 30 minutes in an aqeuous solution of the surfactant Ahcovel at a concentration of 0.5 wt. % and with 0.3% hexanol. The wet nonwoven material was then run through a lab wringer and dried at 60° C. in a convection oven. Hexanol evaporates during drying. The add-on level of Ahcovel was calculated to be 1.37 wt. % relative to the dry mass of the web. The pads covered with the abrasive meltblown web were useful in scrubbing and cleaning a variety of surfaces.

Other exemplary cover materials were also used to assemble sponge-substitutes using the pads described above. Sponge substitutes were constructed using the following cover materials to encase a stack of bonded tissue layers, according to the present invention: spunbond webs (used commercially as the inner liner of HUGGIES™ diapers), creped spunbond webs, SCOTT™ paper towel, VIVA™ paper towel, apertured film, co-apertured spunbond-surge materials, CORONOP apertured spunbond made by Corovin GmbH of Peine, Germany, and a bonded carded web wiper. A coarse fiber meltblown isotactic polypropylene was also used, but placed on only one side of stack, held in place with a hotmelt adhesive.

Example No. 2

High molecular weight isotactic polypropylene (Achieve 3915, Exxon Chemical Co) was used in a pilot meltblown facility to make a polymer net by meltblown fiberization. The polypropylene was extruded through a meltblown die at 485° F. on a porous Teflon conveyor web with an underlying vacuum. The web speed was 10 ft/min. A meltblown polypropylene net with a basis weight of 98 gsm was generated by adjusting the temperature, air pressure, and the distance between the blown head to the forming table, as well as the flow rate of the polymer.

The polypropylene net was then bonded with a pad comprising bonded tissue layers according to the present invention. Bonding of the polypropylene net to the stack was done with a hot melt adhesive (NS-5610, National Starch Chemical Company) using a swirl spray application at 320° F. with a hot melt applicator. The wash pad surface covered with polypropylene net showed excellent adhesion and performed well in scrubbing (high scratch resistance), with scrubbing performance perceived by at least one user to be similar to the Scotch-Brite pad of 3M.

A micrometer (Fowler Precision Tools, Model S2-550-020) was used to measure the diameter of the polypropylene fibers in the meltblown material. Twenty fibers were randomly selected and measured. A range of 0.07 mm to 0.485 mm was obtained, with a mean of 0.25 mm and a standard deviation of 0.13 mm. Several of thickest fibers appear to have been an agglomeration of two fibers.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. An absorbent sponge-like product for cleaning a surface, the sponge-like product comprising:
    a multi-layer compressible substrate, said substrate comprising a plurality of stacked plies of a textured paper web, the paper web having an Overall Surface Depth of greater than about 0.2 mm, the paper web comprising pulp fibers, the paper web having a basis weight of at least about 10 gsm, the paper web containing a wet strength agent, said plies being attached together;
    an outer cover that allows water to pass therethrough, said compressible substrate being enclosed by the outer cover, the outer cover comprising a flexible porous material; and
    abrasive particles attached to the outer cover to facilitate scrubbing of the surface, wherein the abrasive particles comprise filler particles or microspheres.

2. A sponge-like product as defined in claim 1, wherein the stack plies are formed from a single folded paper web.

3. A sponge-like product as defined in claim 1, wherein the paper web further comprises wet resilient fibers, the wet resilient fibers comprising thermomechanical pulp, said wet resilient fibers being present in the paper web in an amount from about 10% to about 50% by weight based upon the total weight of fibers present within the web.

4. A sponge-like product as defined in claim 1, wherein the paper web has a molded textured surface created during throughdrying.

5. A sponge-like product as defined in claim 1, wherein the outer cover comprises a material selected from the group consisting of a meltblown web, a spunbond web, a paper towel, a bonded carded web, a scrim material, a mesh material, a net, an apertured material, and mixtures thereof.

6. A sponge-like product as defined in claim 1, wherein the substrate comprises at least 10 stacked plies.

7. A sponge-like product as defined in claim 1, wherein certain of the stacked plies are apertured.

8. A sponge-like product as defined in claim 1, wherein the paper web has an internal pore volume of at least 50%.

9. A sponge-like product as defined in claim 1, wherein the entire outer cover allows water to pass therethrough.

10. An absorbent sponge-like product for cleaning a surface, the sponge-like product comprising:
a multi-layer compressible substrate, said substrate comprising a plurality of stacked plies of a textured paper web, the paper web having an Overall Surface Depth of greater than about 0.2 mm, the paper web comprising pulp fibers, the paper web having a basis weight of at least about 10 gsm, the paper web containing a wet strength agent, said plies being attached together;
an outer cover that allows water to pass therethrough, said compressible substrate being enclosed by the outer cover, the outer cover comprising a flexible porous material; and
abrasive fibers attached to the outer cover to facilitate scrubbing the surface, wherein the abrasive fibers include meltblown shot.

11. A sponge-like product as defined in claim 10, wherein the stack plies are formed from a single folded paper web.

12. A sponge-like product as defined in claim 10, wherein the paper web further comprises wet resilient fibers, the wet resilient fibers comprising thermomechanical pulp, said wet resilient fibers being present in the paper web in an amount from about 10% to about 50% by weight based upon the total weight of fibers present within the web.

13. A sponge-like product as defined in claim 10, wherein the paper web has a molded textured surface created during throughdrying.

14. A sponge-like product as defined in claim 10, wherein the outer cover comprises a material selected from the group consisting of a meltblown web, a spunbond web, a paper towel, a bonded carded web, a scrim material, a mesh material, a net, an apertured material, and mixtures thereof.

15. A sponge-like product as defined in claim 10, wherein the substrate comprises at least 10 stacked plies.

16. A sponge-like product as defined in claim 10, wherein certain of the stacked plies are apertured.

17. A sponge-like product as defined in claim 10, wherein the paper web has an internal pore volume of at least 50%.

18. A sponge-like product as defined in claim 10, wherein the plies are attached together at selected locations by thermal bonding binder fibers between the plies.

19. A sponge-like product as defined in claim 18, wherein the binder fibers comprise multicomponent fibers.

20. A sponge-like product as defined in claim 18, wherein the binder fibers are applied to each ply in an amount of from about 1% to about 5% by weight of each ply.

21. A sponge-like product as defined in claim 10, wherein the plies are attached together at selected locations using an adhesive.

22. A sponge-like product as defined in claim 10, wherein the outer covering includes a first section attached to a second section, the first section having an abrasive surface.

23. A sponge-like product as defined in claim 22, wherein the first section comprises a meltblown web having shot present on the surface of the web.

24. A sponge-like product as defined in claim 23, wherein the second section comprises a spunbond web or a paper towel.

25. A sponge-like product as defined in claim 10, wherein the sponge-like product contains an additive associated with the compressible substrate, the additive comprising a soap, a detergent, a buffering agent, an antimicrobial agent, a skin wellness agent, an indicator for an analyte, a lotion, or mixtures thereof.

26. A sponge-like product as defined in claim 10, wherein the outer cover is sealed around the compressible substrate.

27. A sponge-like product as defined in claim 10, wherein the textured paper web has a Wet Compressed Bulk of at least about 6 cubic centimeters per gram.

28. A sponge-like product as defined in claim 10, wherein the textured paper web has a Wet Springback value of at least about 0.6.

29. A sponge-like product as defined in claim 10, wherein the compressible substrate has an Absorption Capacity of at least about 6.

30. A sponge-like product as defined in claim 10, wherein the plies are attached together at selected locations using a hot melt adhesive.

31. A sponge-like product as defined in claim 30, wherein the holt melt adhesive is printed onto certain of the textured paper webs.

32. A sponge-like product as defined in claim 10, wherein the product has an Absorption Capacity of at least 12 gm/gm.

33. A sponge-like product as defined in claim 10, wherein the product has an Absorption Capacity of at least 17 gm/gm.

34. A sponge-like product as defined in claim 10, wherein the product has a Wet Compressive Recovery of at least 75%.

35. A sponge-like product as defined in claim 10, wherein the outer cover comprises a meltblown web formed directly on an outer ply of the multi-layer compressible substrate.

36. A sponge-like product as defined in claim 10, wherein the outer cover comprises a meltblown web having an open structure, the meltblown web comprising fibers having a mean diameter of greater than about 0.2 mm.

37. A sponge-like product as defined in claim 10 that is substantially latex free.

38. A sponge-like product as defined in claim 10, further comprising an absorbent layer of foam.

39. A sponge-like product as defined in claim 10, further comprising an indicator that detects the presence of an analyte.

40. A sponge-like product as defined in claim 39, wherein the indicator changes color in the presence of an analyte selected from biological pathogens and toxins.

41. A sponge-like product as defined in claim 10, comprising a binder material that has been printed in a pattern to one or more of the plies.

42. A sponge-like product as defined in claim 41, wherein the printed binder material is a hotmelt that was applied in the molten state.

43. A sponge-like product as defined in claim 41, wherein the printed binder material is a latex.

44. A sponge-like product as defined in claim 10, wherein the entire outer cover allows water to pass therethrough.

45. An absorbent sponge-like product for cleaning a surface, the sponge-like product comprising:
- a multi-layer compressible substrate, said substrate comprising a plurality of stacked plies of a paper web, the paper web comprising softwood fibers and high-yield fibers, the paper web having a basis weight of from about 15 gsm to about 80 gsm, the paper web having a molded textured surface, the paper web containing a wet strength agent, and wherein the plies of the substrate are attached together at selected locations by thermally bonding binder fibers between the plies; and
- an outer cover that allows water to pass therethrough, said compressible substrate being enclosed by the outer cover, the outer cover including a first primary surface and a secondary primary surface, said first primary surface being made from a meltspun nonwoven web having an abrasive surface defining said primary surface, wherein said abrasive surface comprises meltblown shot.

46. A sponge-like product as defined in claim 45, wherein said first primary surface comprises a meltblown web having shot present on the surface of the web.

47. A sponge-like product as defined in claim 45, wherein the secondary primary surface is made from a paper web, a spunbond web, or a meltblown web.

48. A sponge-like product as defined in claim 45, wherein the binder fibers are applied to each ply in an amount from about 1% to about 5% by weight.

49. A sponge-like product as defined in claim 45, wherein the substrate comprises at least ten stacked plies.

50. A sponge-like product as defined in claim 49, wherein the paper web has an internal pore volume of at least 50%.

51. A sponge-like product as defined in claim 45, wherein the second primary surface is water impermeable.

52. A sponge-like product as defined in claim 45, further comprising a water impervious barrier material positioned in between said first primary surface and said second primary surface, said barrier material for preventing fluids contacting the first primary surface to reach the second primary surface.

53. A sponge-like product as defined in claim 45, wherein the entire outer cover allows water to pass therethrough.

54. A tool for scrubbing surfaces comprising:
- a handle; and
- a sponge-like product connected to the handle, said sponge-like product comprising:
  (a) a multi-layer compressible substrate, said substrate comprising a plurality of stacked plies of an uncreped throughdried paper web, the paper web comprising pulp fibers, the paper web having a basis weight of from about 15 gsm to about 80 gsm, the paper web containing a wet strength agent, said plies being attached together; and
  (b) an outer cover that allows water to pass therethrough, said compressible substrate being enclosed by the outer cover, the outer cover being made from a material being selected from the group consisting of a meltblown web, a spunbond web, a paper towel, a bonded carded web, a scrim material, a mesh material, a net, an apertured material, and mixtures thereof.

55. A tool as defined in claim 54, wherein the tool comprises a mop.

56. A tool as defined in claim 54, wherein the paper web comprises softwood fibers and high-yield fibers, said paper web having a molded textured surface created during throughdrying, said substrate including at least ten stacked plies, said plies being attached together at selected locations by thermally bonding binder fibers between the plies.

57. A tool as defined in claim 56, wherein the binder fibers comprise bicomponent fibers.

58. A tool as defined in claim 57, wherein the bicomponent fibers are incorporated into the paper web during formation.

59. A method of making a sponge-like pad for cleaning a surface, the method comprising:
- providing a plurality of textured, wet resilient paper web layers comprising papermaking fibers;
- disposing thermoplastic binder fibers on one or more of the wet resilient paper web layers;
- stacking three or more of the paper web layers such that the thermoplastic binder fibers are between the adjacent layers;
- heating the binder fibers to melt at least a portion of the fibers;
- cooling the melted portion of the binder fibers, whereby the binder fibers fuse and join the adjacent layers together to form an integral stack of paper web layers; and
- enclosing the stack in a liquid pervious cover, wherein said liquid pervious cover defines an abrasive surface comprising meltblown shot.

60. A method as defined in claim 59, wherein the textured paper web layers comprise throughdried paper webs containing high-yield fibers, the paper webs having an Overall Surface Depth of greater than about 0.2 mm.

61. A method as defined in claim 59, further comprising applying a molten polymer to the surface of at least one paper web layer of the plurality of paper web layers and allowing the polymer to harden to form an abrasive surface on the paper web.

62. A method as defined in claim 59, further comprising applying a curable polymer to the surface of at least one paper web layer of the plurality of paper web layers and curing the polymer to form an abrasive surface on the paper web.

63. A method as defined in claim 62, wherein the curable polymer is a photocurable resin and wherein curing the polymer comprises applying light to the resin to photocure it.

64. A method as in claim 59, wherein the entire liquid pervious cover allows water to pass therethrough.

* * * * *